United States Patent
Hochdoerffer et al.

(10) Patent No.: US 10,800,074 B2
(45) Date of Patent: Oct. 13, 2020

(54) FOOTWEAR UPPER COMPONENTS HAVING CONTOURED FOAM REGIONS AND METHODS OF FORMING SUCH COMPONENTS

(71) Applicant: NIKE, Inc., Beaverton, OR (US)

(72) Inventors: Michael Hochdoerffer, Portland, OR (US); Christopher J. Lyke, Portland, OR (US); Atikom Tappatarnpornsuk, Taichung (TW)

(73) Assignee: NIKE, Inc., Beaverton, OR (US)

( * ) Notice: Subject to any disclaimer, the term of this patent is extended or adjusted under 35 U.S.C. 154(b) by 250 days.

(21) Appl. No.: 15/911,511

(22) Filed: Mar. 5, 2018

(65) Prior Publication Data

US 2018/0194043 A1    Jul. 12, 2018

Related U.S. Application Data

(62) Division of application No. 14/252,292, filed on Apr. 14, 2014, now Pat. No. 9,937,644.

(51) Int. Cl.
| | |
|---|---|
| *B29C 44/12* | (2006.01) |
| *B29D 35/14* | (2010.01) |
| *B29C 44/16* | (2006.01) |
| *A43B 23/02* | (2006.01) |
| *A43B 23/04* | (2006.01) |

(Continued)

(52) U.S. Cl.
CPC ...... *B29C 44/1271* (2013.01); *A43B 23/0225* (2013.01); *A43B 23/0235* (2013.01); *A43B 23/042* (2013.01); *B29C 44/16* (2013.01); *B29D 35/146* (2013.01); *B29D 35/148* (2013.01); *B29K 2075/00* (2013.01); *B29L 2031/505* (2013.01)

(58) Field of Classification Search
CPC ... B29C 44/1271; B29C 44/16; B29D 35/146; B29D 35/148
See application file for complete search history.

(56) References Cited

U.S. PATENT DOCUMENTS

| | | |
|---|---|---|
| 3,505,436 A | 4/1970 | Krug et al. |
| 4,875,966 A | 10/1989 | Perko |
| 5,785,909 A | 7/1998 | Chang et al. |

(Continued)

FOREIGN PATENT DOCUMENTS

| | | |
|---|---|---|
| CH | 440684 A | 7/1967 |
| DE | 20202390 U1 | 6/2003 |

(Continued)

OTHER PUBLICATIONS

International Search Report and Written Opinion for PCT/US2015/022276 dated Jul. 14, 2015.

*Primary Examiner* — Christopher T Schatz
(74) *Attorney, Agent, or Firm* — Banner & Witcoff, Ltd.

(57) ABSTRACT

An upper shell panel may be placed between first and second sections of a mold. The first section may include one or more expansion cavities and the second section may include one or more pour cavities. A foam-producing chemical mixture may be delivered into the one or more pour cavities and the mold may be closed. The delivered foam-producing chemical mixture may be allowed to expand within the closed mold and to force regions of the upper shell panel into the one or more expansion cavities. The upper shell panel may then be removed from the mold subsequent to the expansion of the delivered mixture.

18 Claims, 34 Drawing Sheets

(51) Int. Cl.
*B29L 31/50* (2006.01)
*B29K 75/00* (2006.01)

(56) References Cited

U.S. PATENT DOCUMENTS

| | | | |
|---|---|---|---|
| 5,885,500 | A | 3/1999 | Tawney et al. |
| 8,321,984 | B2 | 12/2012 | Dojan et al. |
| 8,572,866 | B2 | 11/2013 | Dojan et al. |
| 2011/0277923 | A1 | 11/2011 | Fox et al. |
| 2012/0066931 | A1 | 3/2012 | Dojan et al. |
| 2013/0291409 | A1 | 11/2013 | Reinhardt et al. |

FOREIGN PATENT DOCUMENTS

| | | | |
|---|---|---|---|
| FR | 2517252 | A1 | 6/1983 |
| JP | S59229324 | A | 12/1984 |

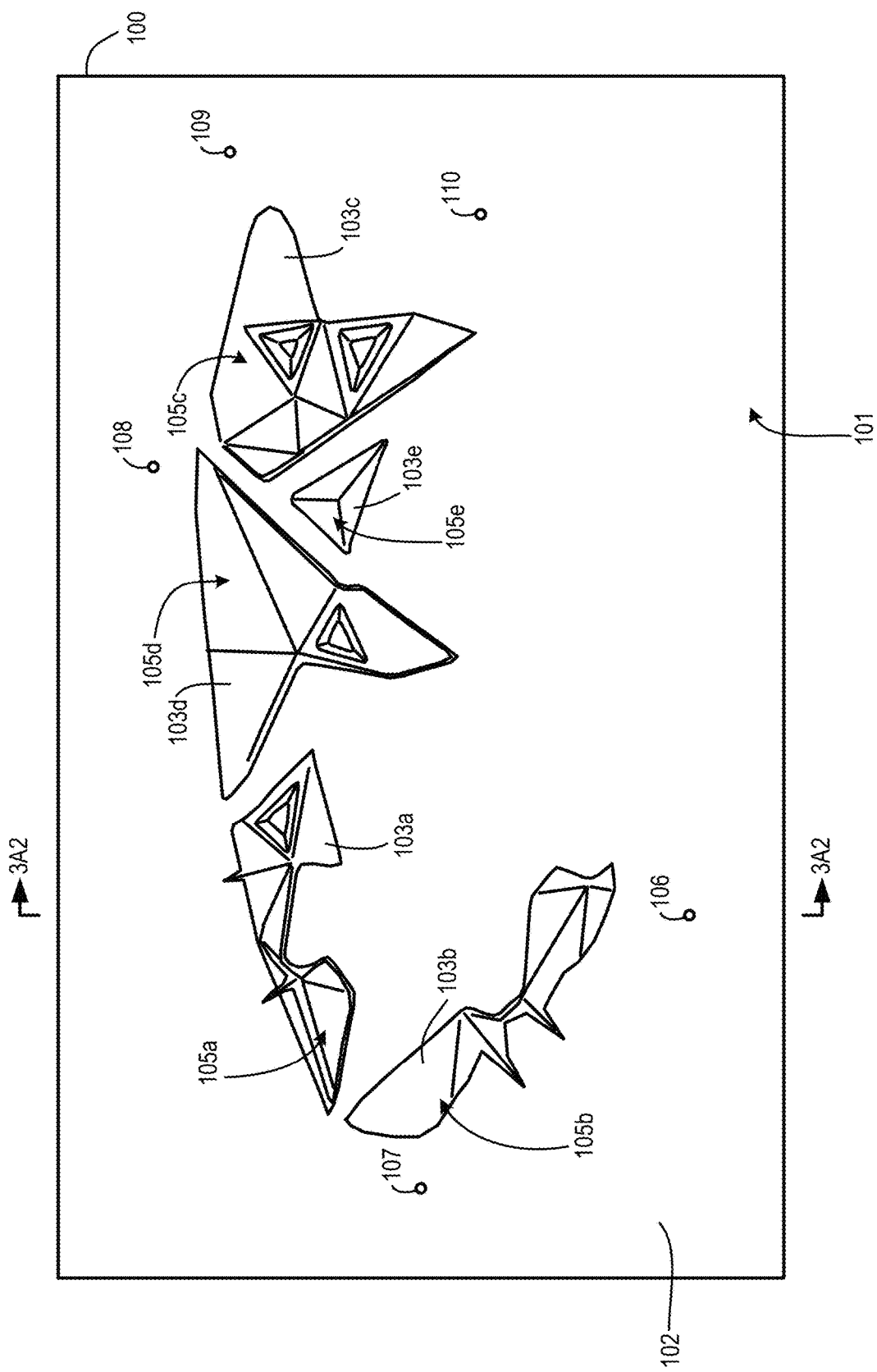
FIG. 3A1

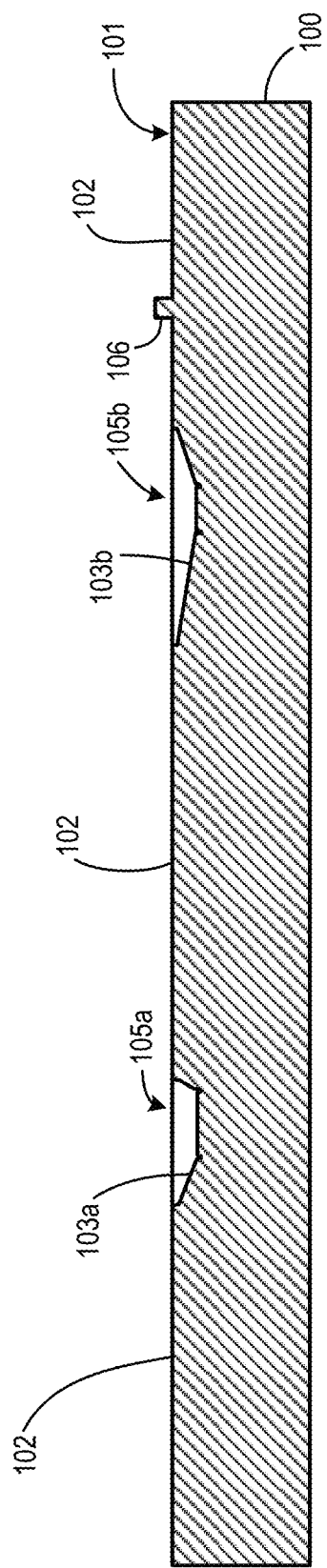
FIG. 3A2

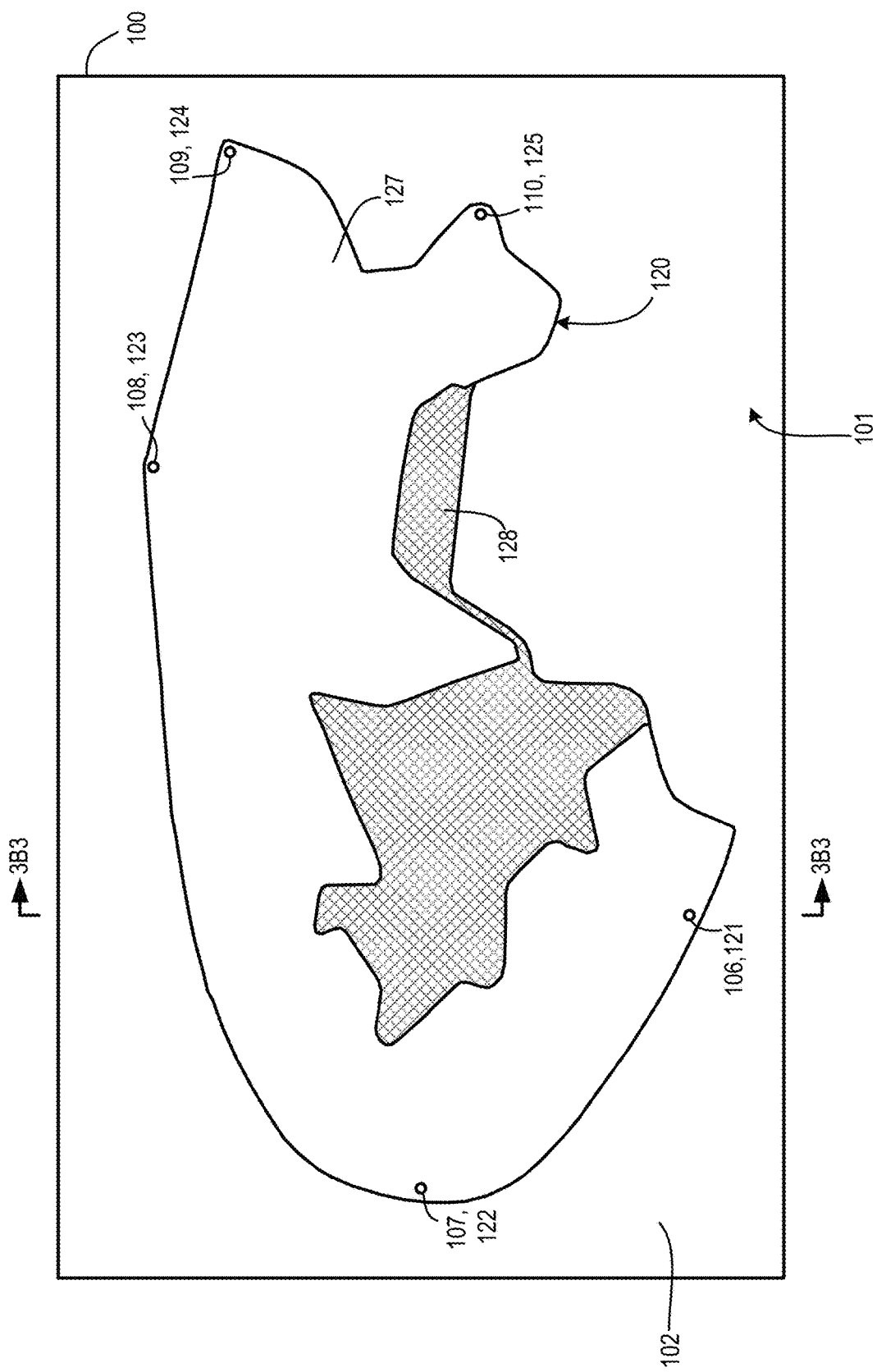
FIG. 3B1

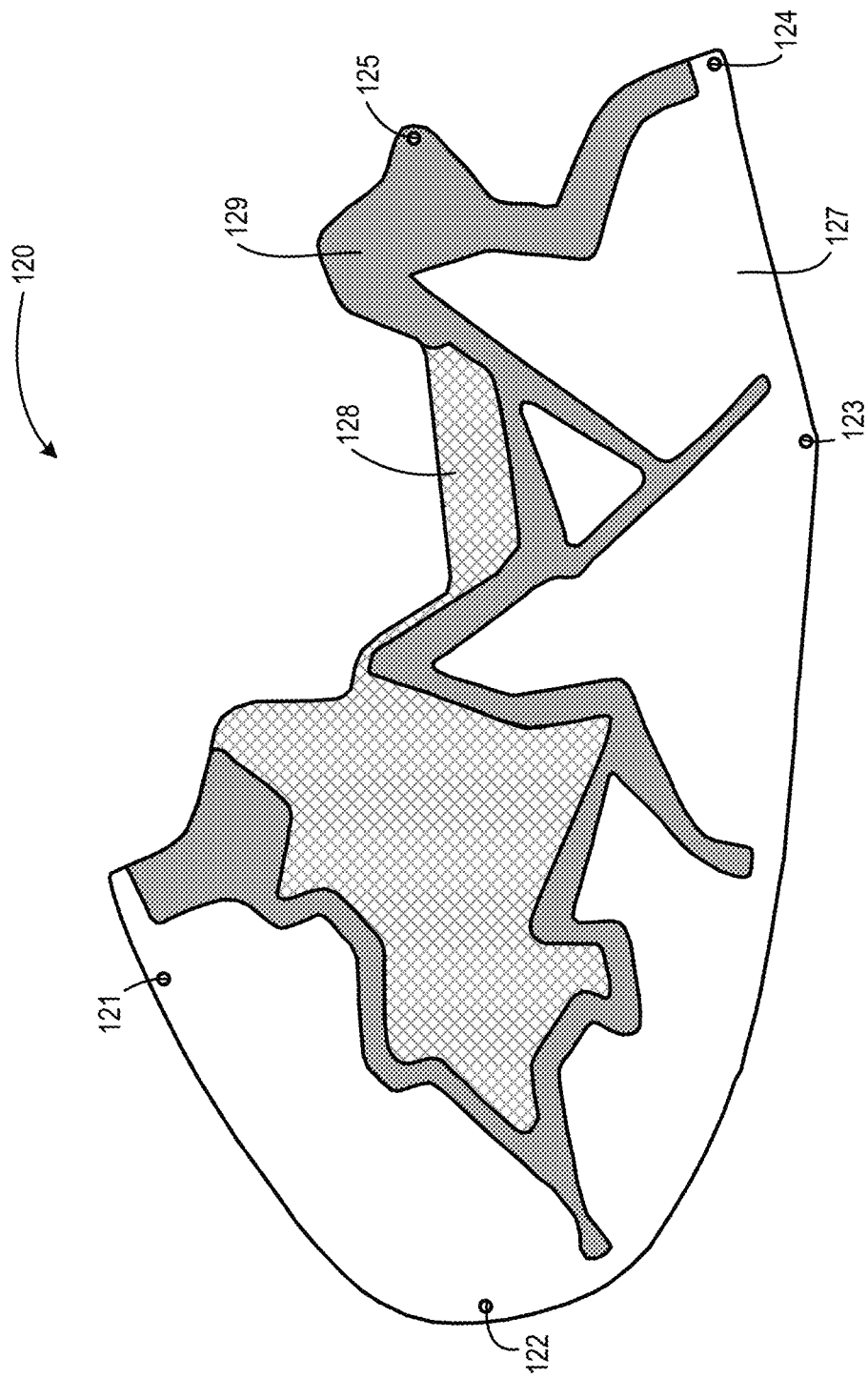
FIG. 3B2

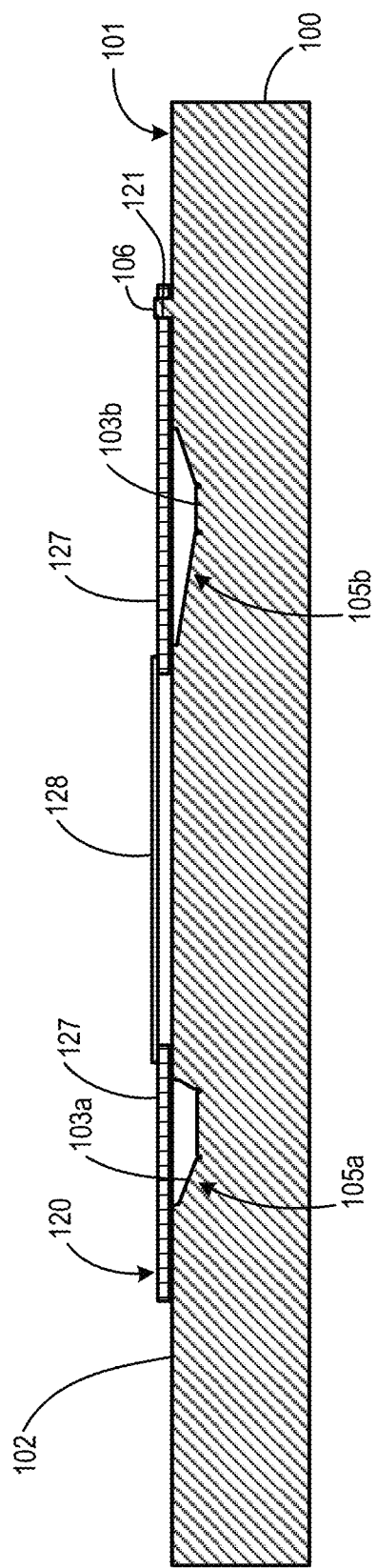
FIG. 3B3

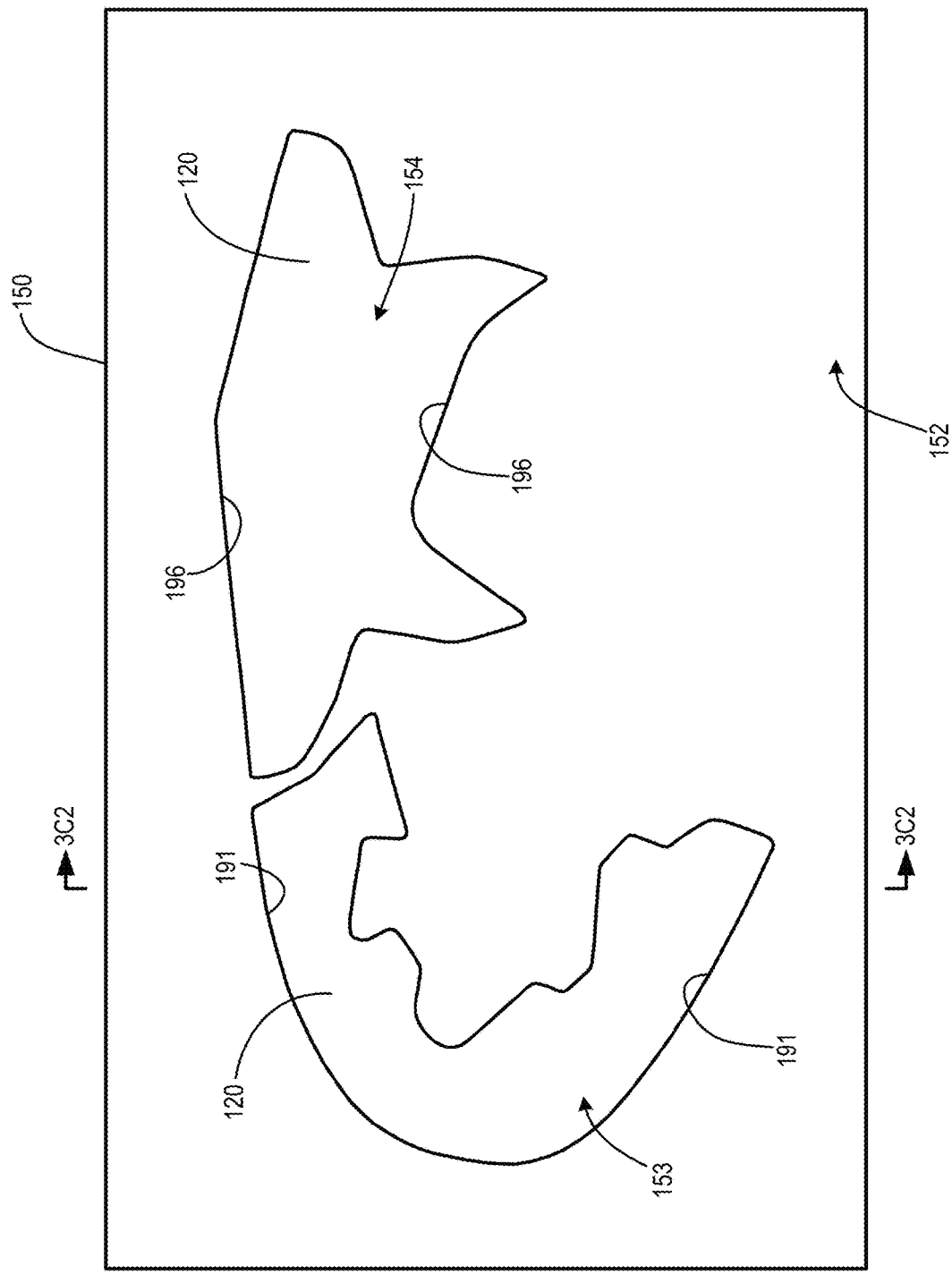
FIG. 3C1

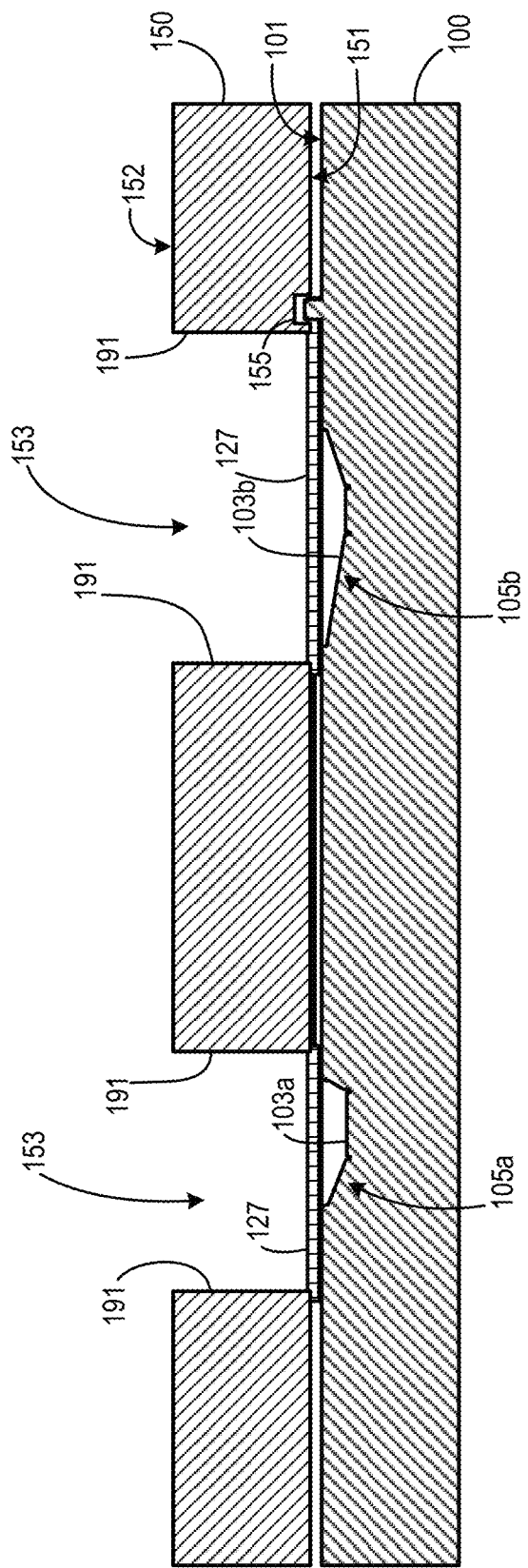
FIG. 3C2

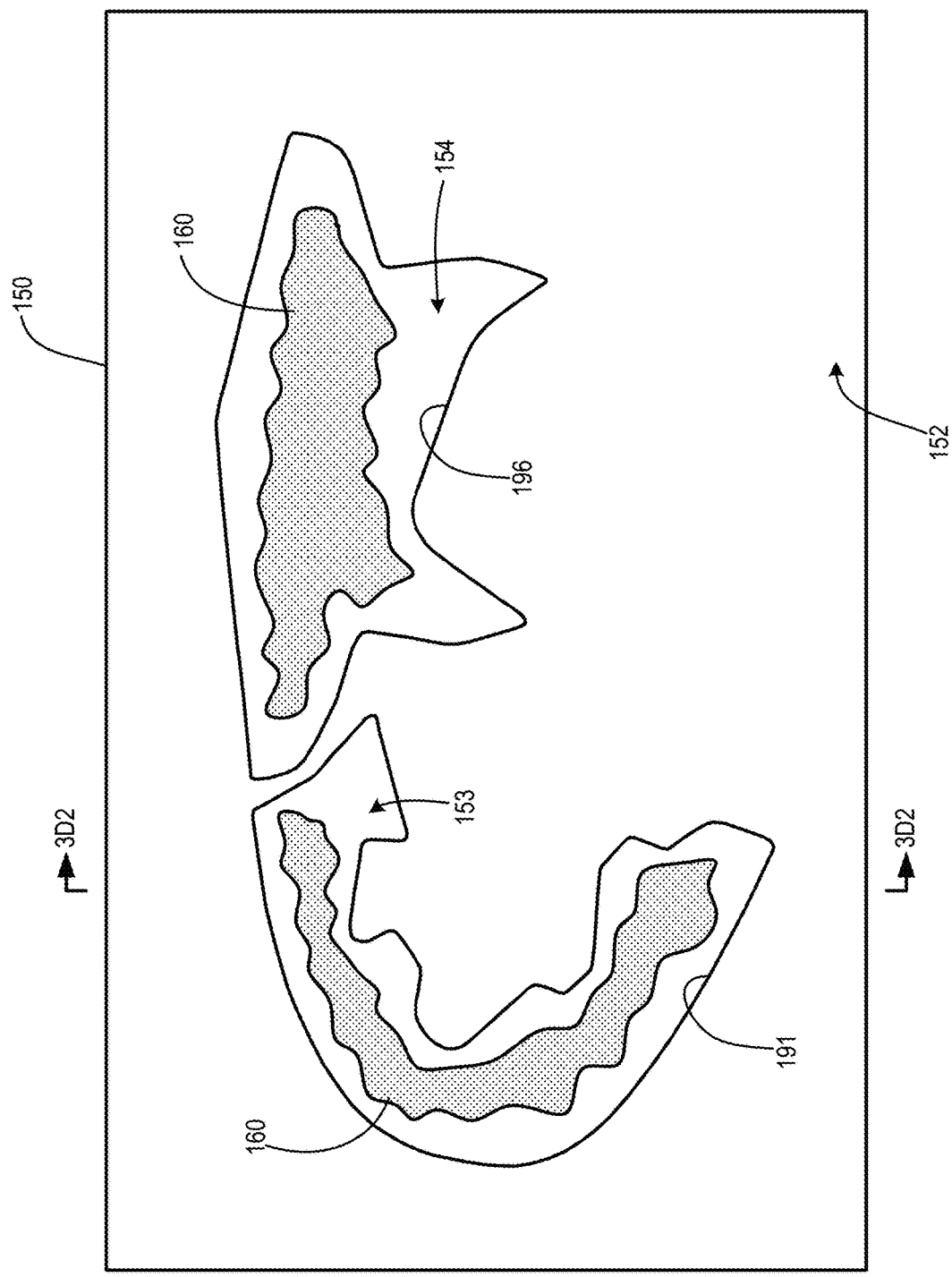
FIG. 3D1

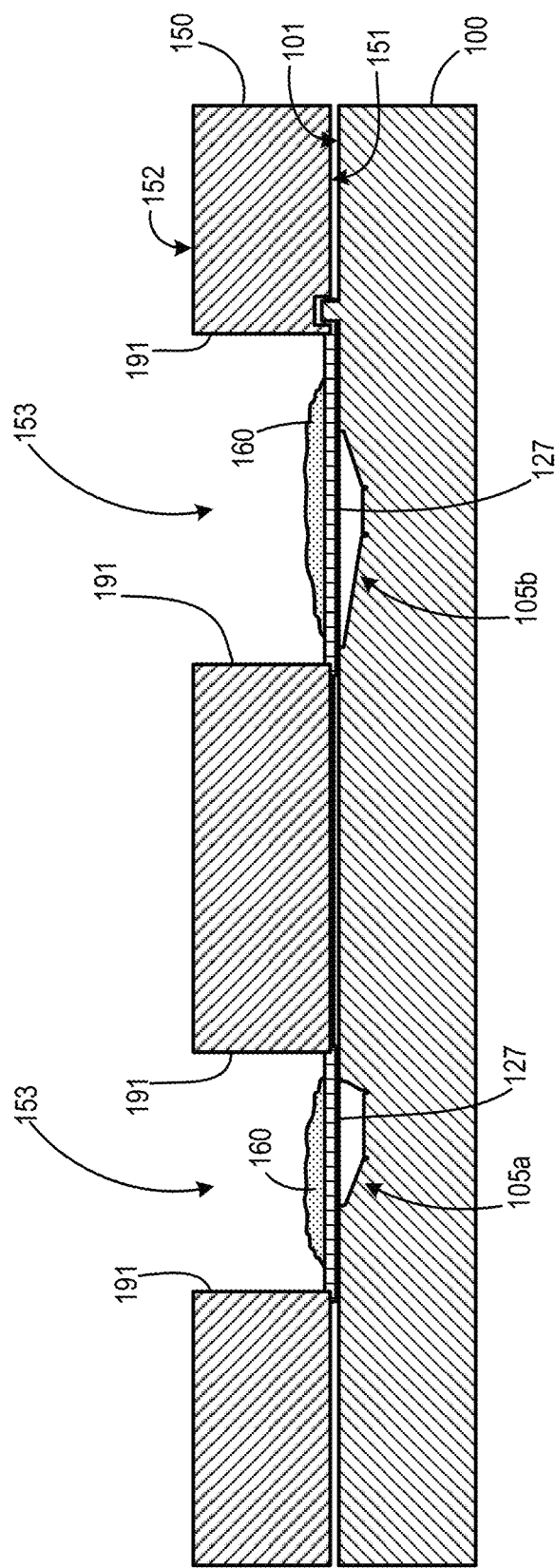
FIG. 3D2

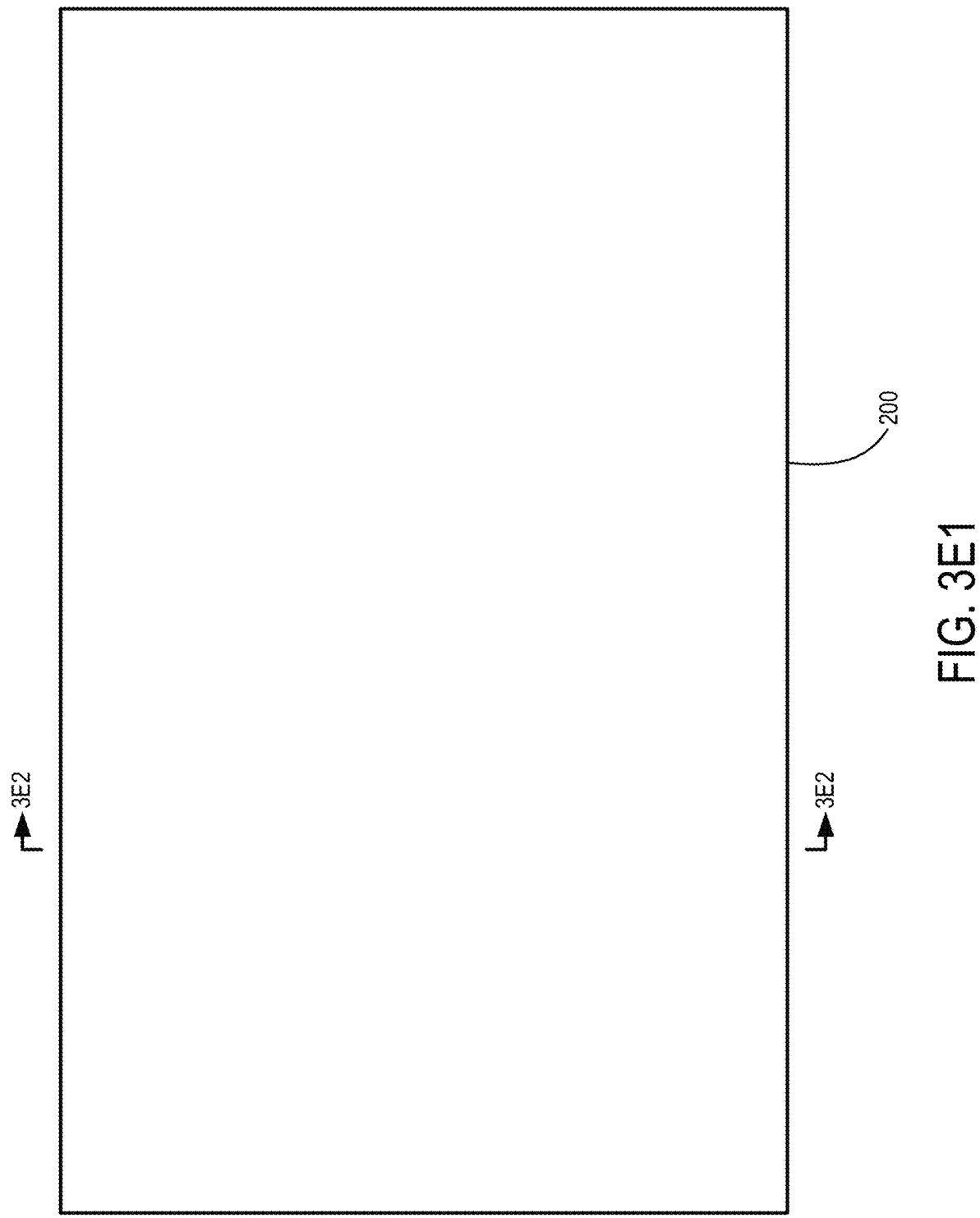
FIG. 3E1

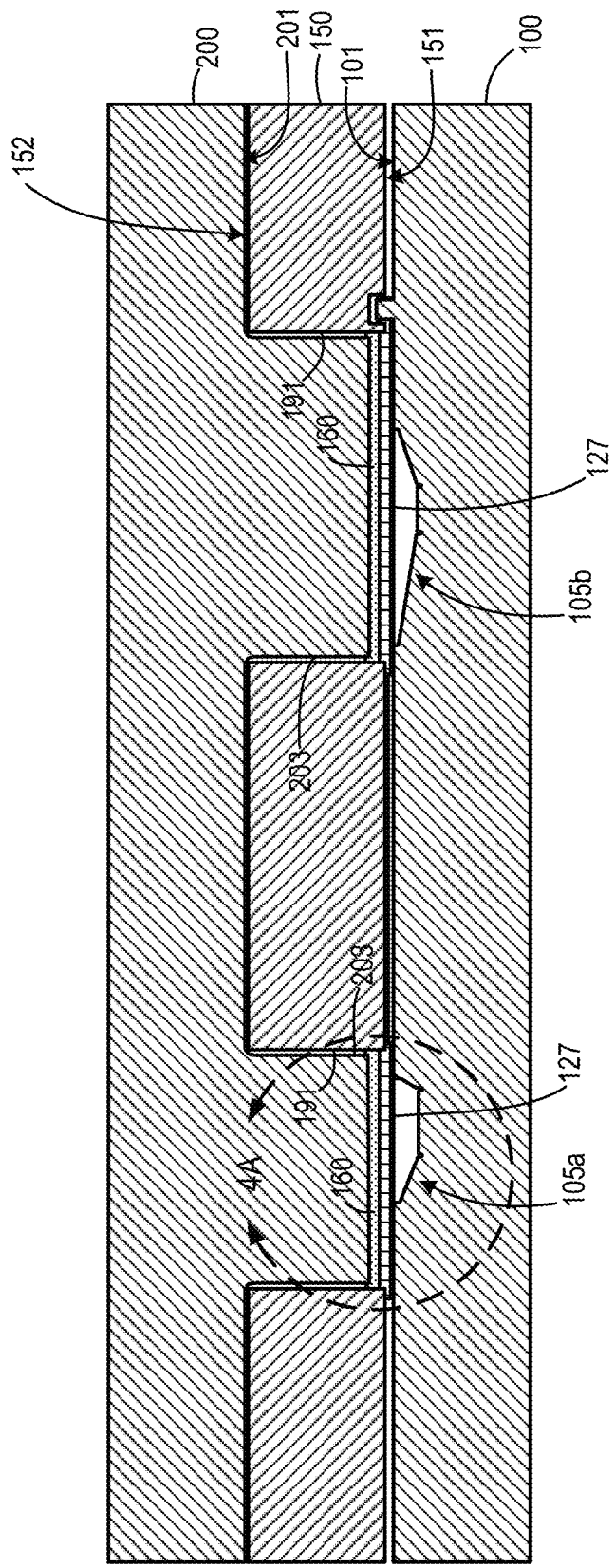
FIG. 3E2

US 10,800,074 B2

FOOTWEAR UPPER COMPONENTS HAVING CONTOURED FOAM REGIONS AND METHODS OF FORMING SUCH COMPONENTS

CROSS-REFERENCE TO RELATED APPLICATION

This application is a division of U.S. patent application Ser. No. 14/252,292, titled "Footwear Upper Components Having Contoured Foam Regions and Methods of Forming Such Components" and filed Apr. 14, 2014. U.S. patent application Ser. No. 14/252,292, in its entirety, is incorporated by reference herein.

BACKGROUND

Conventional articles of footwear generally include an upper and a sole structure. The upper provides a covering for the foot and securely positions the foot relative to the sole structure. The sole structure is secured to a lower surface of the upper and configured so as to be positioned between the foot and the ground when a wearer is standing, walking or running.

It is sometimes desirable to include foam padding in regions of a footwear upper. In some cases, such padding may be added for aesthetic reasons. For example, a shoe designer might wish to include raised portions on a shoe upper to enhance certain lines, to create a certain look, to emulate a product logo, or for other reasons. In other cases, foam padding may be added for functional reasons. As one example thereof, increased padding in certain areas may provide extra impact protection to a wearer foot. As another example, padding may also or alternatively be added to stiffen certain areas and provide increased foot support.

An upper of a completed shoe typically has a shape that approximates the shape of the top and side portions of a human foot. This three-dimensional geometry is relatively complex. Conventionally, several techniques have been used to add foam-padded regions to an upper. In one such technique, a foam pad is created by molding foam onto a piece of a textile material. Foam is not formed on a perimeter portion of that material so as to leave a flange around the foam. The element may then be attached to an upper by stitching or otherwise attaching the flange to other components of that upper. Disadvantages of this technique include the requirement for additional sewing operations.

Another conventional technique involves placing an upper onto a foot-shaped form known as a last. The lasted upper is then placed into a mold that surrounds the lasted upper. A foam-producing chemical mixture is poured into regions of the mold cavity that are adjacent to the exterior surface of the lasted upper. Although this technique can avoid the need to sew foam pads onto the upper, it has other disadvantages. For example, molds used in this technique are relatively complex and expensive to fabricate.

SUMMARY

This Summary is provided to introduce a selection of concepts in a simplified form that are further described below in the Detailed Description. This Summary is not intended to identify key features or essential features of the invention.

Some embodiments include a method for fabricating a component of a footwear upper having contoured foam regions. In methods according to some such embodiments, an upper shell panel may be placed between first and second sections of a mold. The first section may include one or more expansion cavities and the second section may include one or more pour cavities. A foam-producing chemical mixture may be delivered into the one or more pour cavities and the mold may be closed. The delivered foam-producing chemical mixture may be allowed to expand within the closed mold and to force regions of the upper shell panel into the one or more expansion cavities. The upper shell panel may then be removed from the mold subsequent to the expansion of the delivered mixture.

Additional embodiments include methods for fabricating upper shells, uppers, shoes and other articles that include steps, similar to those indicated above, for fabricating a component having contoured foam regions. Further embodiments include upper shells, uppers, shoes and other articles having components that include contoured foam regions fabricated or fabricatable according to one or more method embodiments.

BRIEF DESCRIPTION OF THE DRAWINGS

Some embodiments are illustrated by way of example, and not by way of limitation, in the figures of the accompanying drawings and in which like reference numerals refer to similar elements.

FIG. 3A1 is a plan view of a first mold element according to some embodiments.

FIG. 3A2 is an enlarged area cross sectional view taken from the location indicated in FIG. 3A1 and rotated 90° counterclockwise.

FIG. 3B1 shows the first mold element of FIG. 3A1 immediately after placement of an upper shell panel onto a working face thereof.

FIG. 3B2 is a plan view of the exterior face of the upper shell panel of FIG. 3B1.

FIG. 3B3 is an enlarged area cross-sectional view taken from the location indicated in FIG. 3B1 and rotated 90° counterclockwise.

FIG. 3C1 shows a second mold element placed onto the first mold element of FIG. 3B1.

FIG. 3C2 is an enlarged area cross-sectional view taken from the location indicated in FIG. 3C1 and rotated 90° counterclockwise.

FIG. 3D1 shows the second mold element of FIG. 3C1 after delivery of a foam-producing chemical mixture into pour cavities.

FIG. 3D2 is an enlarged area cross-sectional view taken from the location indicated in FIG. 3D1 and rotated 90° counterclockwise.

FIG. 3E1 shows a third mold element after placement onto the second mold element of FIG. 3D1.

FIG. 3E2 is an enlarged area cross-sectional view taken from the location indicated in FIG. 3E1 and rotated 90° counterclockwise.

DETAILED DESCRIPTION

Figure 1A:
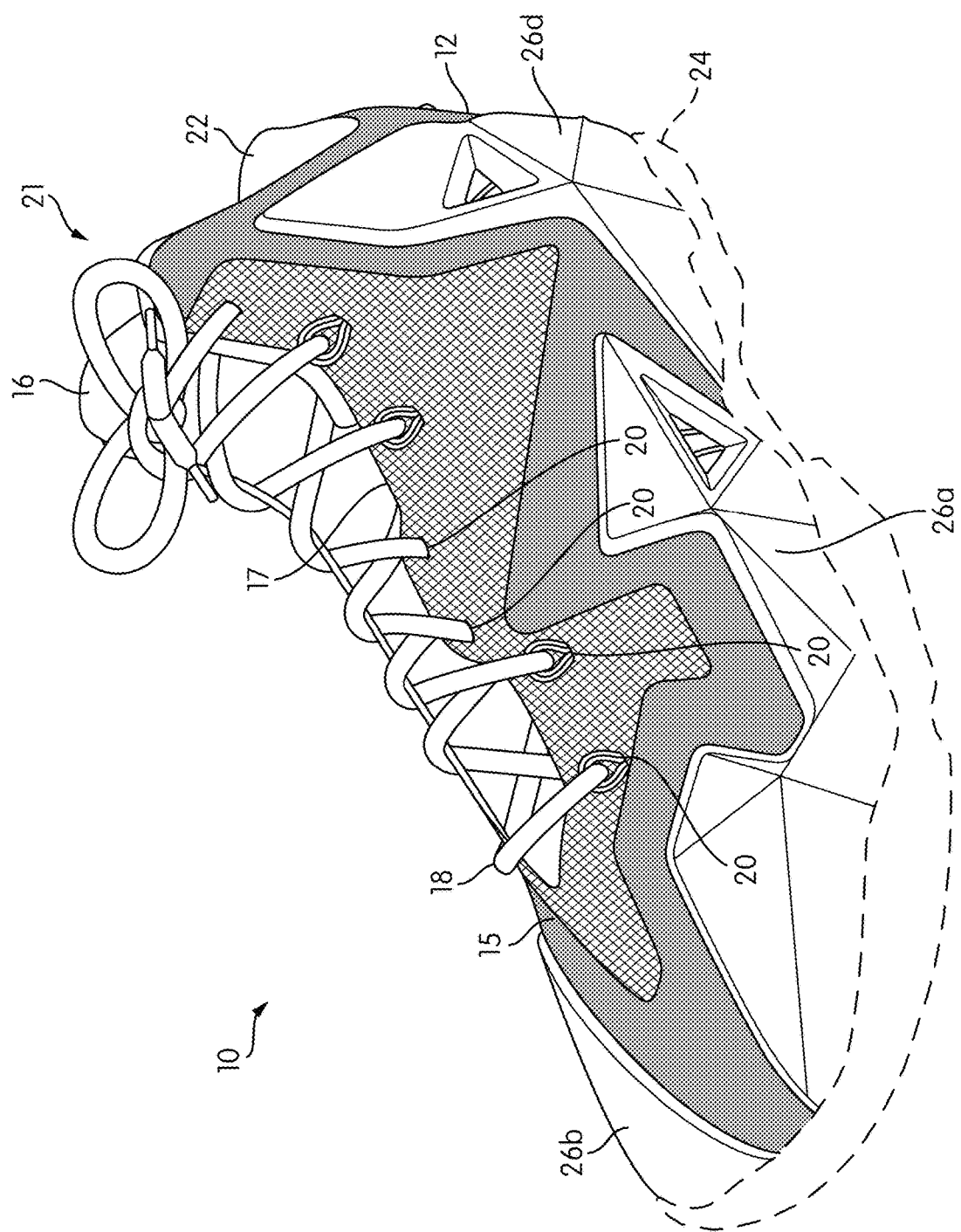
FIG. 1A is a front lateral perspective view of a shoe incorporating an upper component formed using a method according to at least some embodiments.

To assist and clarify subsequent description of various embodiments, various terms are defined herein. Unless context indicates otherwise, the following definitions apply throughout this specification (including the claims). "Shoe" and "article of footwear" are used interchangeably to refer to articles intended for wear on a human foot. A shoe may or may not enclose the entire foot of a wearer. For example, a shoe could include a sandal or other article that exposes large portions of a wearing foot. The "interior" of a shoe refers to space that is occupied by a wearer's foot when the shoe is worn. An interior side, surface, face or other aspect of a shoe component refers to a side, surface, face or other aspect of that component that is (or will be) oriented toward the shoe interior in a completed shoe. An exterior side, surface, face or other aspect of a component refers to a side, surface, face or other aspect of that component that is (or will be) oriented away from the shoe interior in the completed shoe. In some cases, the interior side, surface, face or other aspect of a component may have other elements between that interior side, surface, face or other aspect and the interior in the completed shoe. Similarly, an exterior side, surface, face or other aspect of a component may have other elements between that exterior side, surface, face or other aspect and the space external to the completed shoe.

Elements and regions of a shoe can be described based on regions and/or anatomical structures of a human foot wearing that shoe, and by assuming that shoe is properly sized for the wearing foot. As an example, a forefoot region of a foot includes the metatarsal and phalangeal bones. A forefoot region of a shoe is a region having one or more portions located over, under, to the lateral and/or medial sides of, and/or in front of a wearer's forefoot (or portion thereof) when the shoe is worn. As another example, a midfoot region of a foot includes the cuboid, navicular, medial cuneiform, intermediate cuneiform and lateral cuneiform bones and the heads of the metatarsal bones. A midfoot region of a shoe is a region having one or more portions located over, under and/or to the lateral and/or medial sides of a wearer's midfoot (or portion thereof) when the shoe is worn. As a further example, a heel region of a foot includes the talus and calcaneus bones. A heel region of a shoe is a region having one or more portions located over, under, to the lateral and/or medial sides of, and/or behind a wearer's heel (or portion thereof) when the shoe is worn. The forefoot region may overlap with the midfoot region, as may the midfoot and heel regions.

Embodiments include methods for forming a footwear upper component that includes one or more contoured foam regions. Embodiments may also include such components and footwear or other articles that incorporate such components. To help describe methods and articles according to various embodiments, an example of a finished shoe 10 is provided in FIGS. 1A through 1C. As will be explained below, shoe 10 includes a component having contoured foam regions. Shoe 10 is merely one example of a shoe that includes one type of component having contoured foam regions. Embodiments include articles in which a fabricated upper component is different from that shown in FIGS. 1A through 1C, as well as methods for fabricating such articles.

Figure 1B:
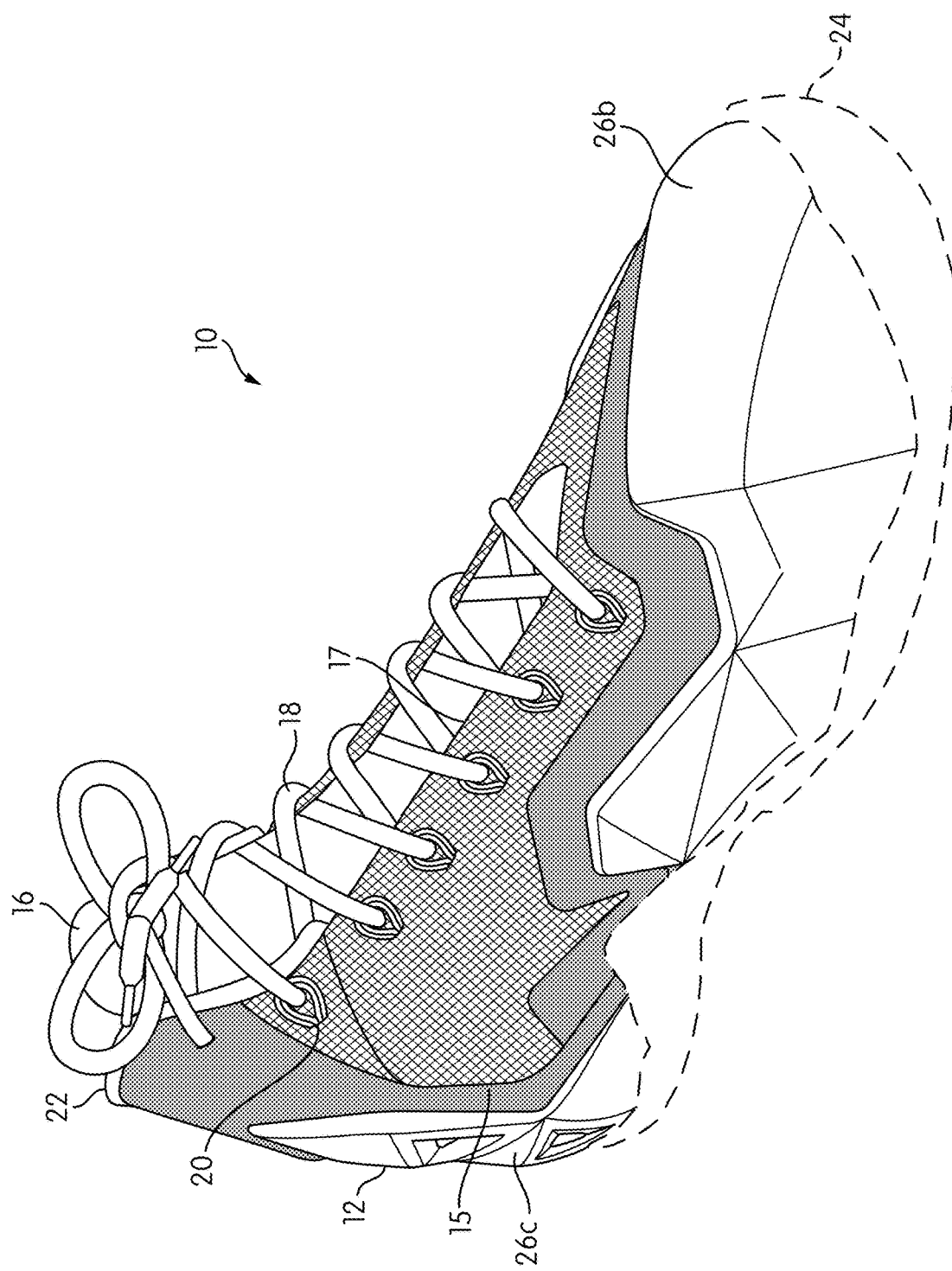
FIG. 1B is a front medial perspective view of the shoe in FIG. 1A.
Figure 1C:
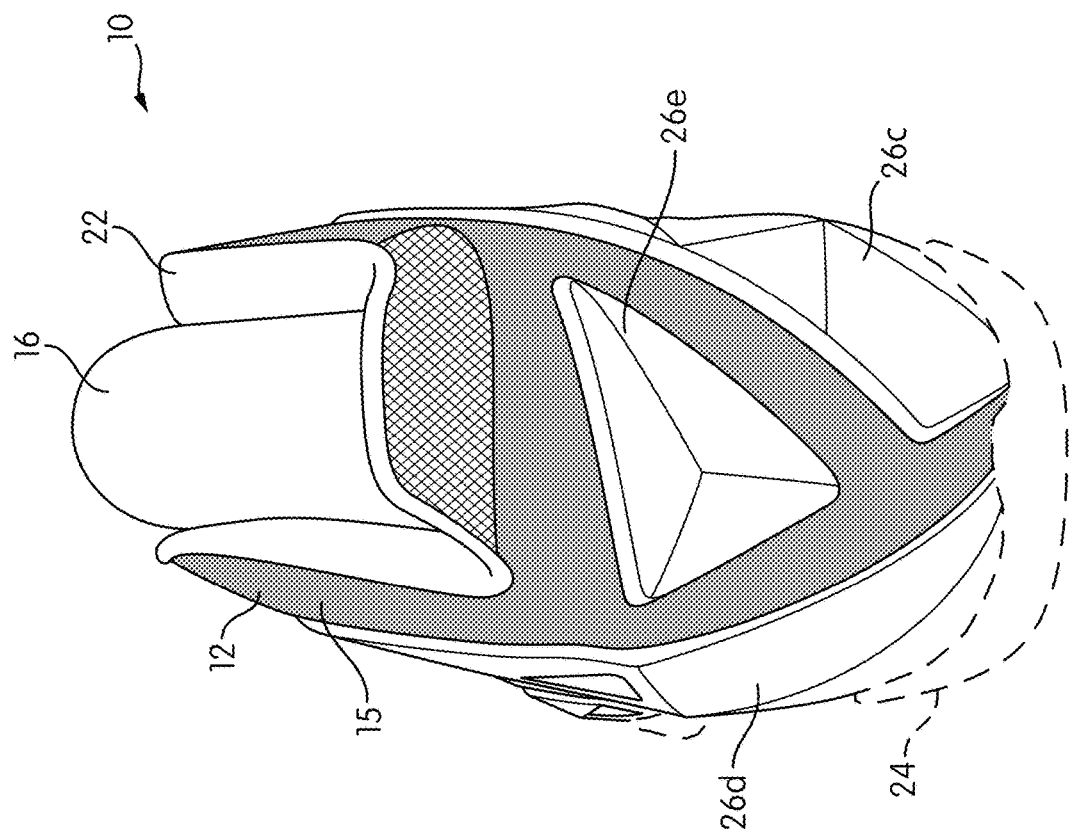
FIG. 1C is a rear view of the shoe in FIG. 1A.

FIG. 1A is a lateral side perspective view of shoe 10. FIG. 1B is a medial side perspective view of shoe 10. FIG. 1C is a rear view of shoe 10. Shoe 10 is a left foot shoe and is part of a pair that includes a right foot shoe (not shown) that is a mirror image of shoe 10. An upper 12 of shoe 10 incorporates a shell 15 that covers side and top regions of a foot of a shoe 10 wearer. As explained in further detail below, shell 15 is formed as a substantially planar component and then folded into a complex three-dimensional shape. One edge of the folded shell may then be secured to another edge of the folded shell so as to maintain that three-dimensional shape.

Upper 12 also includes a tongue 16 situated under a tongue opening 17. A lace 18 passes through multiple lacing elements 20 on opposite sides of tongue opening 17. Lace 18 may be tightened to selectively change the size of tongue opening 17 and ankle opening 21, thereby permitting a wearer to modify girth and other dimensions of the upper 12 to accommodate feet of varying proportions. In the embodiment of shoe 10, shell 15 forms the main body of upper 12. Shell 15 is joined (e.g., by stitching and/or bonding) to padded collar 22, to tongue 16, and to other components of upper 12. Upper 12 is also attached to a lasting element (not visible in FIGS. 1A-1C) that closes a bottom of a foot-receiving interior void formed by upper 12. With the exception of tongue opening 17, shell 15 completely surrounds the top and sides of a wearer foot. In some embodiments, shell 15 may be joined to a bootie and/or to one or more other internal upper elements that extend over sides and/or the top of a wearer foot. For example, upper 12 may include cord-like tensile reinforcing elements that extend from lace elements 20 to a footbed region of shoe 10.

Upper 12 is attached to a sole structure 24. Sole structures of numerous widely varying types can be incorporated into shoes that include upper components fabricated according to one or more embodiments. For convenience, sole structure 24 is thus indicated generically in the drawing figures. Upper 12 may extend over toe and instep regions, along medial and lateral sides, and around the heel region. As indicated above, upper 12 may be attached to a Strobel or other lasting element, not shown, which forms part of a footbed portion of shoe 10. That lasting element and upper 12 form an interior void that has the general shape of a left foot. The interior void may be accessed (e.g., a foot may be inserted) through ankle opening 21. Padded collar 22 surrounds ankle opening 21 and extends downward into the heel region interior of upper 12. In some embodiments, and as described in further detail below, the lasting element may be stitched or otherwise attached to a lower edge of shell 15. The exterior/bottom face of the lasting element may then be glued or otherwise attached to sole structure 24.

Shell 15 includes numerous contoured foam regions 26a through 26e. As seen in FIG. 1A, a front lateral foam region 26a extends from the lateral midfoot region to the lateral toe region. A front medial foam region 26b extends from the medial midfoot region to the medial toe region (FIG. 1B). A rear medial foam region 26c extends over and around the medial heel region (FIGS. 1B and 1C). A rear lateral foam region 26d extends over and around the lateral heel region (FIGS. 1A and 1C). A rear foam region 26e is located in a rear heel region (FIG. 1C). The shapes and arrangement of foam regions 26a-26e in shoe 10 merely represent one example. Embodiments include articles having contoured foam regions in differing shapes and/or arrangements, articles having fewer contoured foam regions, articles having more contoured foam regions, and methods for fabricating such articles.

Figure 2:
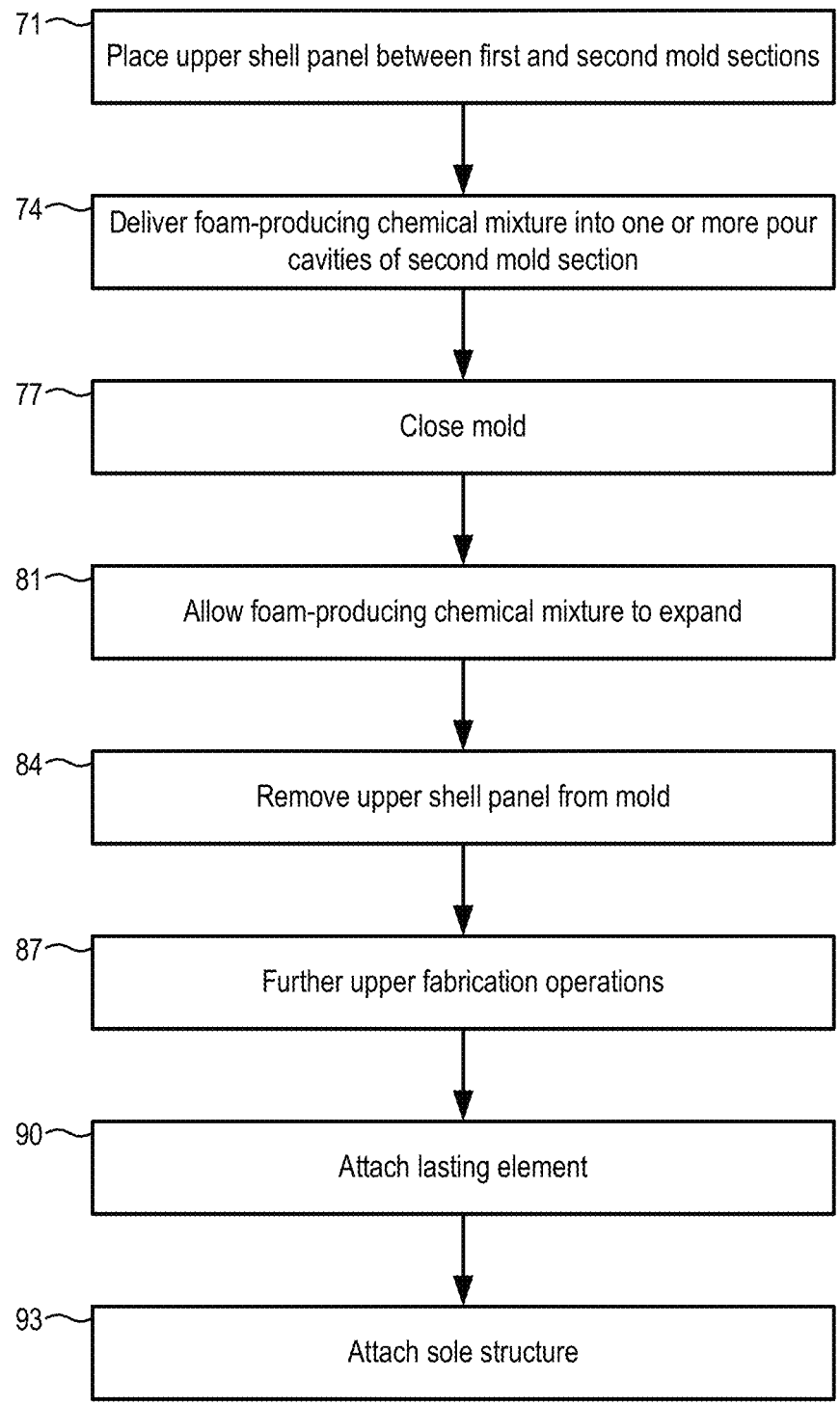
FIG. 2 is a flow chart showing steps in a method according to some embodiments.

FIG. 2 is a flow chart showing steps in methods, according to at least some embodiments, for fabricating an article of footwear that incorporates a component that includes contoured foam regions. Subsets of the steps shown in FIG. 2 represent methods for forming footwear upper components. In step 71, an unfolded upper shell panel is placed between first and second sections of a mold. The first mold section may include one or more expansion cavities that correspond to contoured foam regions to be formed. The working face of the first mold section may include a planar base surface and one or more contoured surfaces that define the one or more expansion cavities. Examples of first mold sections and of placement of an upper shell panel between first and second mold sections are described below.

In step 74, a foam-producing chemical mixture is delivered into one or more pour cavities of the second mold section. The foam-producing chemical mixture may be a combination of chemicals that react to form polyurethane foam. Examples of second mold sections and of a foam-producing chemical mixture delivered into second mold section pour cavities are described below.

The mold is closed in step 77. As part of the closing step, the mold sections may be clamped or otherwise secured together. Examples of closed molds are described below. In step 81, the foam-producing chemical mixture is allowed to expand and cure. As the mixture expands, regions of the upper shell panel are forced into the one or more expansion cavities in the first mold section. As part of step 81, the closed mold may be heated to speed or otherwise assist curing. Examples of the expansion during step 81 are described below.

In step 84, and after opening the mold, the upper shell panel is removed from the mold. An example of an upper shell panel immediately after removal from an opened mold is described below in connection with FIGS. 5A and 5B. In step 87, that upper shell panel may then undergo further operations to complete fabrication of the upper. Those further operations may include trimming, an example of which is described in connection with FIG. 6. The further operations also include folding the upper shell panel so that it has a complex three-dimensional shape that forms a portion of a foot-receiving void. Those further operations may further include attachment of a tongue, a bootie or other liner, tensile reinforcements and/or other elements. The attachment of such elements may occur before or after folding of the upper shell panel.

In step 90, a Strobel or lasting element may be attached to the upper. In some embodiments, the lasting element may be stitched directly to the shell. In some embodiments, e.g., certain double lasting embodiments such described below, the lasting element may only be stitched to a bootie and/or other components of the upper and/or may be indirectly attached to the shell. In still other embodiments, a lasting element may be stitched to a bootie and/or other upper components inside a shell and then glued to the shell.

In step 93, the sole structure is attached to the upper. In some embodiments, such as where the upper shell has already been stitched to a lasting element, step 93 may simply comprise bonding sole structure components (e.g., one or more midsoles, one or more outsoles, etc.) to the lasting element and upper while the upper is on a last. In some embodiments, the upper may be double-lasted. In some such double-lasted embodiments, and as indicated above, the lasting element is stitched to a bootie and/or other internal upper components but is not stitched to the shell. After placing the upper (with stitched lasting element) onto a last, lower front, lower rear and lower side edge portions of the shell interior are then folded over and bonded to the lasting element. The sole structure components may then bonded to the lasting element and folded over shell edges.

Step 90 may be omitted in some embodiments. In some double lasted embodiments, for example, the upper (without a lasting element) may be placed onto a last. A preformed foam midsole may then be placed onto the bottom surface of the last (i.e., the surface that approximately corresponds to a wearer foot). Lower front, lower rear and lower side edge portions of the shell interior are then folded over and bonded to the midsole. An example of this type of double lasting is described in commonly owned U.S. Pat. No. 8,572,866 (titled "Shoe with Composite Upper and Foam Element and Method of Making Same"), which patent is incorporated by reference herein.

The steps shown in FIG. 2 need not be performed in the order indicated. In some embodiments, for example, an unfolded upper shell panel is placed between first and second mold sections before a foam-producing chemical mixture is delivered into a pour cavity of the second mold section. Such an embodiment is described below in connection with FIGS. 3A1 through 6. In other embodiments, a foam-producing chemical mixture is delivered into a pour cavity of a second mold section before an unfolded upper shell panel is placed between a first mold section and a second mold section. Such an embodiment is described below in connection with FIGS. 8A and 8B.

In some embodiments, and as described below in connection with FIGS. 3A1 through 4B, an upper shell such as shell 15 is fabricated using a three section mold. The first mold section may include a working face on which an unfolded upper shell panel may be placed. That working face may further include expansion cavities corresponding to contoured foam regions to be formed on the upper shell panel. A second mold section may include one or more pour cavities into which a foam-producing chemical mixture may be delivered. A third mold section may be used to cover the pour cavities and may include pistons to spread and/or compress the mixture within the pour cavities. Each section may be a single element or may include multiple elements.

FIG. 3A1 is a plan view of a first mold element 100 according to some embodiments. First mold element 100 is the first section of a mold used, in a method according to FIG. 2, to fabricate shell 15 of shoe 10 upper 12. First mold element 100 may be formed from steel or other metal through one or more conventional processes such as casting and machining. A working face 101 of first mold element 100 is visible in FIG. 3A1. FIG. 3A2 is an enlarged area cross sectional view of first mold element 100 taken from the location indicated in FIG. 3A1 and rotated 90° counterclockwise.

Working face 101 includes a flat base surface 102 and multiple contoured surfaces 103a through 103e. The contoured surfaces 103a-103e are recessed into first mold element 100 from base surface 102 and define expansion cavities 105a-105e. Each of expansion cavities 105a-105e corresponds to one of the contoured foam regions 26a-26e of shell 15 (FIGS. 1A-1C). Expansion cavity 105a corresponds to front lateral foam region 26a and has a contoured surface 103a. The shape of contoured surface 103a is generally the same as the surface contour of foam region 26a prior to folding of an upper shell panel to form shell 15. Expansion cavity 105b corresponds to front medial foam region 26b and has a contoured surface 103b. The shape of contoured surface 103b is generally the same as the surface contour of foam region 26b prior to folding of an upper shell panel to form shell 15. Expansion cavity 105c corresponds to rear medial foam region 26c and has a contoured surface 103c. The shape of contoured surface 103c is generally the same as the surface contour of foam region 26c prior to folding of an upper shell panel to form shell 15. Expansion cavity 105d corresponds to rear lateral foam region 26d and has a contoured surface 103d. The shape of contoured surface 103d is generally the same as the surface contour of foam region 26d prior to folding of an upper shell panel to form shell 15. Expansion cavity 105e corresponds to rear foam region 26e and has a contoured surface 103e. The shape of contoured surface 103e is generally the same as the surface contour of foam region 26e prior to folding of an upper shell panel to form shell 15.

In some embodiments, a mold element may include one more registration projections. As shown below in connection with FIGS. 3B1 and 3B3, such projections can help position an upper shell panel on a mold element face. In the current example, and as also shown in FIGS. 3A1 and 3A2, five registration posts 106 through 110 extend outward from base surface 102. In other embodiments, the number and shape of registration projections may vary. In still other embodiments, registration projections may be omitted.

FIG. 3B1 shows first mold element 100 immediately after an upper shell panel 120 has been placed onto working face 101 in a flat, unfolded condition. A peripheral portion of panel 120 includes registration holes 121 through 125. When placed onto working face 101, panel 120 is positioned on working face 101 so that posts 106-110 respectively extend through holes 121-125 as downward pressure is applied to the regions of panel 120 surrounding holes 121-125. In this manner, panel 120 can be properly positioned relative to expansion cavities 105a-105e and held in place until one or more elements of a second mold section are put into position.

An interior face of panel 120, which visible in FIG. 3B1, will be located on the interior of shell 15. As will become apparent in connection with subsequent drawing figures, polymer foam will be bonded to regions of the panel 120 interior face so as to form contoured foam regions 26a-26e (as well as an additional foam region spanning regions 26a and 26b and an additional foam region spanning regions 26c-26e). FIG. 3B2 shows the exterior face of panel 120. That exterior face is placed against working face 101 and will become the exterior face of shell 15. As seen in FIG. 3B2, shell panel 120 does not yet include contoured foam regions 26a-26e.

In at least some embodiments, an upper shell panel placed between first and second mold sections may be a composite panel. That composite panel may include panels of different materials that have been bonded together prior to placement of the composite panel between first and second mold sections. In some embodiments, for example, an upper panel placed onto a first mold element working face may be a composite panel formed using techniques described in commonly-owned U.S. Pat. No. 8,321,984 (titled "Composite Shoe Upper and Method of Making Same"), which patent is incorporated by reference herein.

In the example of shoe 10, shell panel 120 is a composite that includes a base panel 127, a mesh panel 128 and skin panel 129 (FIG. 3B2). Shell panel 120 may be formed, prior to placement onto working face 101, using a process such as is described in the above-mentioned U.S. Pat. No. 8,321,984. Interior edge portions of mesh panel 128 overlap and are bonded to exterior regions of base panel 127. Skin panel 129 is bonded to exterior regions of base panel 127 and mesh panel 128. Mesh panel 128 may be, e.g., a woven mesh textile material. Skin panel 129 may be, e.g., a thermoplastic polyurethane. Base panel 127 may itself be a composite material that was formed prior to bonding with panels 128 and 129. In the embodiment of panel 120, base panel 127 is cut from a base panel material that is itself a composite. The base panel material includes a skin layer and an elastic textile layer. The skin layer of the base panel material may be polyurethane or a high melt temperature thermoplastic polyurethane. The elastic textile of the base panel material may be, e.g., spandex (elastane). The skin layer of the base panel material may be the exterior face of base panel 127 and the textile layer of the base panel material may be the interior face of base panel 127.

Shell panel 120 merely represents one example of a shell panel that may be used in some embodiments. Although panel 120 includes three subcomponent panels (base panel 127, mesh panel 128 and skin panel 129), in other embodiments an upper shell panel may include fewer subcomponent panels or may even be a single non-composite panel. In still other embodiments, an upper shell panel may include additional subcomponent panels, different configurations of subcomponent panels, and/or subcomponent panels formed from other types of materials.

FIG. 3B3 is an enlarged area cross-sectional view taken from the location indicated in FIG. 3B1 and rotated 90° counterclockwise. For convenience, skin panel 129 is not represented in FIG. 3B3 or in subsequent cross-sectional views. A first portion of base panel 127 spans and completely covers expansion cavity 105b. Another portion of base panel 127 spans and completely covers expansion cavity 105a. Other portions of base panel 127 span and completely cover expansion cavities 105c-105e.

FIG. 3C1 shows a second mold element 150 after it has been placed onto first mold element 100 and shell panel 120. Second mold element 150 is the second section of a mold used, in a method according to FIG. 2, to fabricate shell 15 of shoe 10 upper 12. Second mold element 150 may also be formed from steel or other metal through one or more conventional processes such as casting and machining. FIG. 3C2 is an enlarged area cross-sectional view taken from the location indicated in FIG. 3C1 and rotated 90° counterclockwise. In the current example, second mold element 150 is a single piece element having a panel face 151 (FIG. 3C2) and a pouring face 152. Second element 150 includes two pour cavities 153 and 154. Pour cavity 153 has a side wall 191; pour cavity 154 has a side wall 196. As shown by the portion of panel 120 visible in pour cavity 153 in FIG. 3C1, and as further shown in FIG. 3C2, pour cavity 153 extends through and has openings in panel face 151 and pouring face 152.

Pour cavity 154 similarly extends through and has openings in faces 151 and 152, as shown by the portion of shell panel 120 exposed in pour cavity 154 in FIG. 3C1.

When second mold element 150 is placed into working position on upper shell panel 120 and first mold element 100, and as seen in FIG. 3C2, shell panel 120 is placed between first and second mold sections. In the embodiment shown, this results in portions of shell panel 120 being pressed between working face 101 of first mold element 100 and panel face 151 of second mold element 150. Other portions of shell panel 120 span the openings of pour cavities 153 and 154 in panel face 151 and form floors of pour cavities 153 and 154. Within the portions of shell panel 120 spanning pour cavities 153 and 154, portions of panel 120 cover expansion cavities 105a through 105e.

Also shown in FIG. 3C2 is a recess 155 formed in panel face 151 of second mold element 150. Recess 155 accommodates post 106 and permits working face 101 and panel face 151 to press against shell panel 120. Panel face 151 of second mold element 150 may include additional recesses corresponding to posts 107-110 of first mold element 100.

After placement of panel 120 (FIGS. 3B1 and 3B2) and placement of second mold element 150 (FIGS. 3C1 and 3C2), a foam-forming material may be delivered into pour cavities 153 and 154. In at least some embodiments, that foam-forming material may be a mixture of chemicals that, upon mixing, react to form a polymer foam. As used herein, "foam-producing chemical mixture" refers to a mixture of chemicals that react to create a polymer foam. Such chemical mixtures are well known. Formulations combinable to form such mixtures are available from numerous commercial sources. In at least some embodiments, the foam-producing chemical mixture used to fabricate an upper component is a pourable combination of chemicals that begin to react shortly after mixing and that then expand and cure to create a polyurethane foam. The time between mixing of chemicals and the beginning of expansion, often referred to as "cream time," may vary based on the precise formulation of chemicals used. In at least some embodiments, the foam-producing chemical mixture used to create polyurethane foam has a cream time that is sufficiently long (e.g., at least 15-60 seconds) to permit a mold to be closed before significant expansion begins. Formulations of chemicals that can be mixed to create polyurethane foam, and that have such a cream time, are widely available from numerous commercial sources.

FIG. 3D1 shows second mold element 150 immediately after delivery of foam-producing chemical mixture 160 into pour cavities 153 and 154. In at least some embodiments, and as indicated above, mixture 160 is a combination of chemicals that react to form polyurethane foam and that have a cream time of at least 15-60 seconds. Mixture 160 is delivered into pour cavity 153 through the opening of pour cavity 153 in pouring face 152 and into pour cavity 154 through the opening of pour cavity 154 in pouring face 152. In some embodiments, mixture 160 may be delivered by a conventional pouring head that receives components of the mixture from separate fluid lines and that mixes those components as they flow through a dispensing nozzle of the pouring head. Mixture 160 may be deposited onto the exposed interior surfaces of shell panel 120 that span cavities 153 and 154. In the embodiment shown, this results in deposition of mixture 160 onto portions of the base panel 127 exposed in cavities 153 and 154.

FIG. 3D2 is an enlarged area cross-sectional view taken from the location indicated in FIG. 3D1 and rotated 90° counterclockwise. Mixture 160 is resting directly on the interior faces of the portions of panel 120 that span pour cavities 153 and 154. In some embodiments, and as indicated in FIGS. 3D1 and 3D2, foam-producing chemical mixture 160 may have a viscosity such that mixture 160 does not immediately spread over the entire exposed portions of panel 120.

FIG. 3E1 shows a third mold element 200 after it has been placed onto second mold element 150, after delivery of mixture 160 into cavities 153 and 154, to complete the mold closing step. Third mold element 200 is the third section of a mold used, in a method according to FIG. 2, to fabricate shell 15 of shoe 10 upper 12. Third mold element 200 may also be formed from steel or other metal through one or more conventional processes such as casting and machining.

FIG. 3E2 is an enlarged area cross-sectional view taken from the location indicated in FIG. 3E1 and rotated 90° counterclockwise. As seen in FIG. 3E2, third mold element 200 includes a mold closing face 201 that is oriented toward pouring face 152 of second mold element 150. Closing face 201 includes a piston 203 that projects into pour cavity 153. Piston 203 has the same shape as pour cavity 153 and fits closely against wall 191 of pour cavity 153. Although not visible, closing face 201 includes a similar piston that projects into pour cavity 154, that has the same shape as pour cavity 154 and that fits closely against wall 196 of pour cavity 154. As can be appreciated from FIG. 3E2, piston 203 acts to spread previously-delivered mixture 160 over the portion of panel 120 that spans pour cavity 153, to compress mixture 160 within pour cavity 153, and to close pour cavity 153. The piston within pour cavity 154 similarly acts to spread previously-delivered mixture 160 over the portion of panel 120 that spans pour cavity 154, to compress mixture 160 within pour cavity 154, and to close pour cavity 154.

Figure 4A:
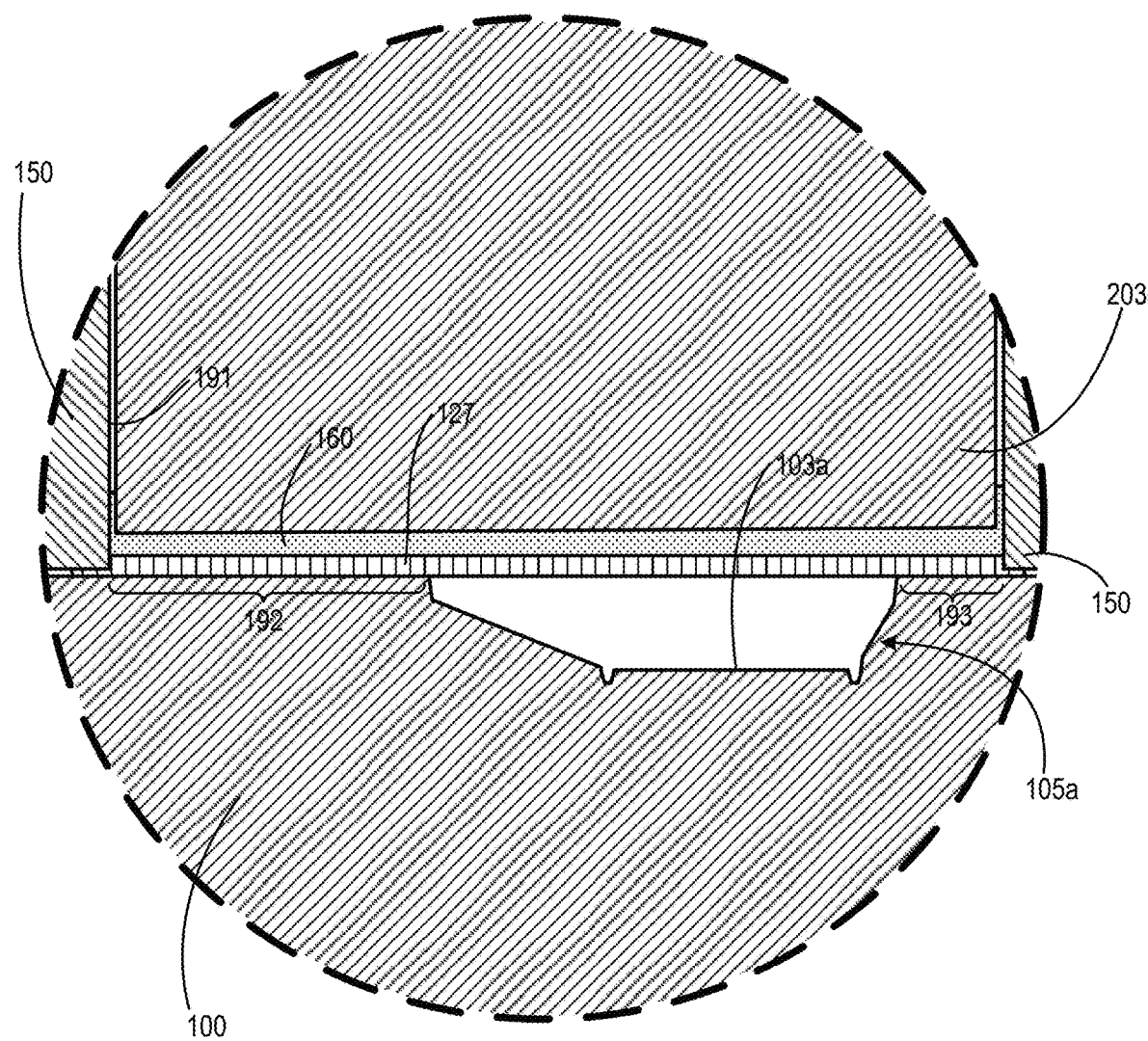
FIG. 4A is a further enlarged view of the region indicated in FIG. 3E2.

FIG. 4A is a further enlarged view of the region indicated in FIG. 3E2. In FIGS. 3E2 and 4A, the cream time for mixture 160 has not yet expired. Accordingly, mixture 160 has not begun to significantly expand in FIGS. 3E2 and 4A.

After being placed together as shown in FIGS. 3E1 and 3E2, mold elements 100, 150 and 200 may be clamped together. The clamped mold elements may then be placed into a heat tunnel or otherwise heated while mixture 160 reacts to expand and form polymer foam and while mixture 160 cures.

Figure 4B:
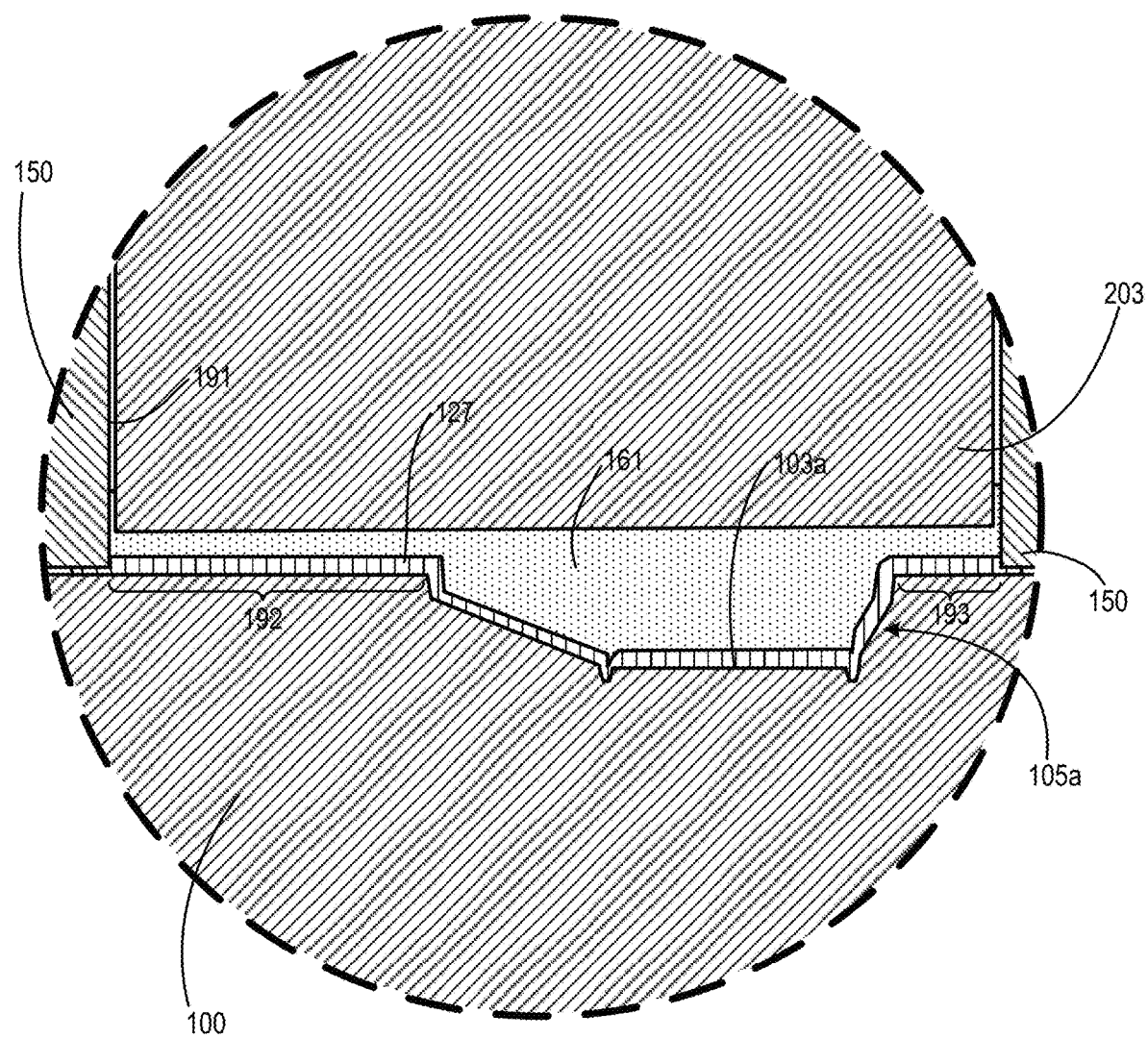
FIG. 4B is a view of the same region shown in FIG. 4A after expansion of the foam-producing chemical.

FIG. 4B is a view of the same region shown in FIG. 4A. At the time represented in FIG. 4B, however, foam-producing chemical mixture 160 has reacted to form polymer foam 161. Expansion pressure during formation of foam 161 has pushed a portion of panel 120 into expansion cavity 105a. As a result, the exterior surface of that panel 120 portion has the contour of surface 103a of cavity 105a. The remainder of expansion cavity 105a is filled with foam 160. In a similar manner, expansion pressure during formation of foam 161 has pushed additional portions of panel 120 into expansion cavities 105b-105e so that the exterior surfaces of those panel 120 portions have the contours of surfaces 103b-103e, respectively. The remainder of cavities 105b-105e are similarly filled with foam 161. Foam 161 is bonded to the interior of surfaces of the panel 120 portions that span pour cavities 153 and 154 (including the portions within expansion cavities 105a-105e).

Figure 4C:
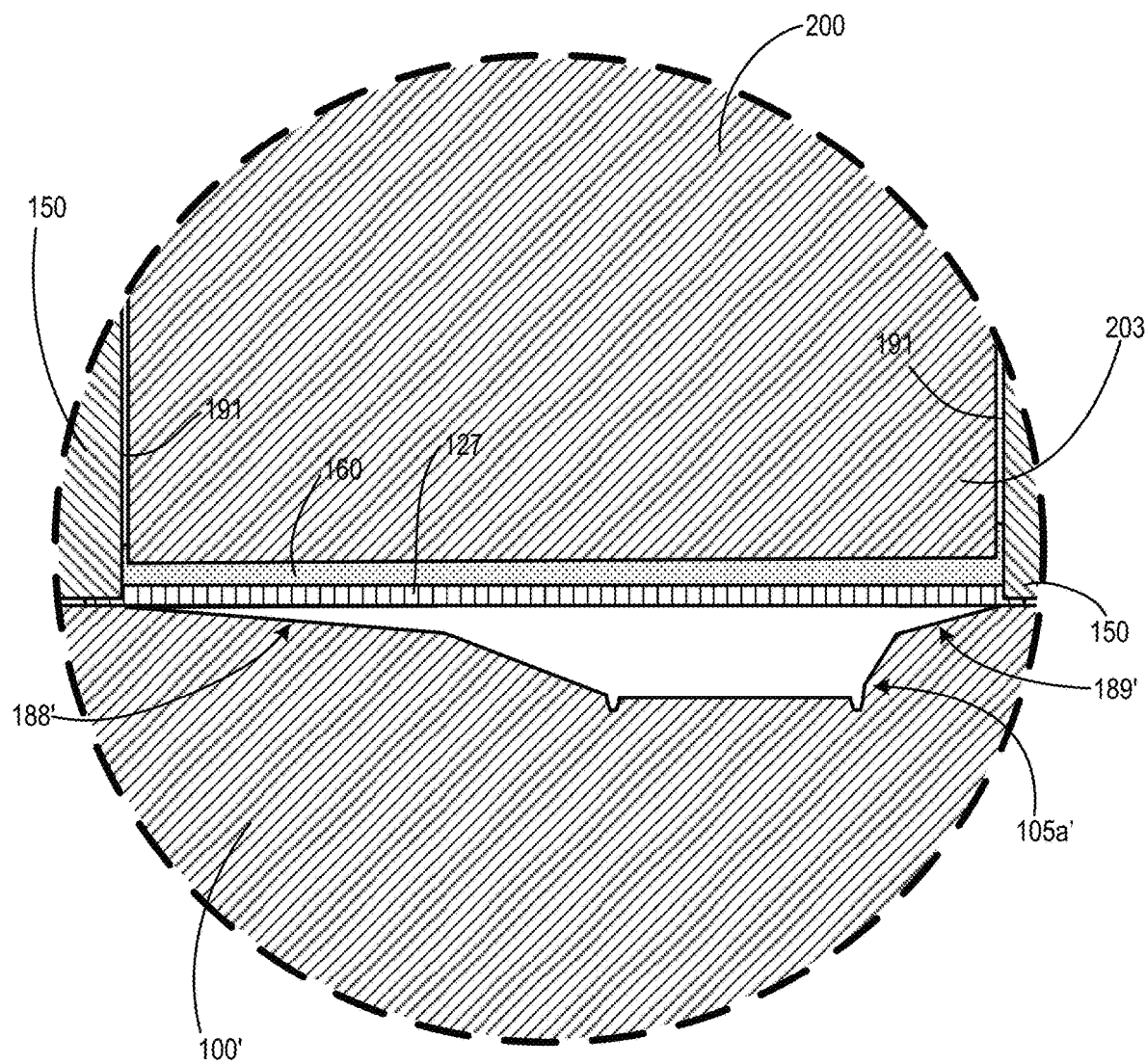
FIGS. 4C and 4D are enlarged views of an assembly of mold elements according to another embodiment.
Figure 4D:
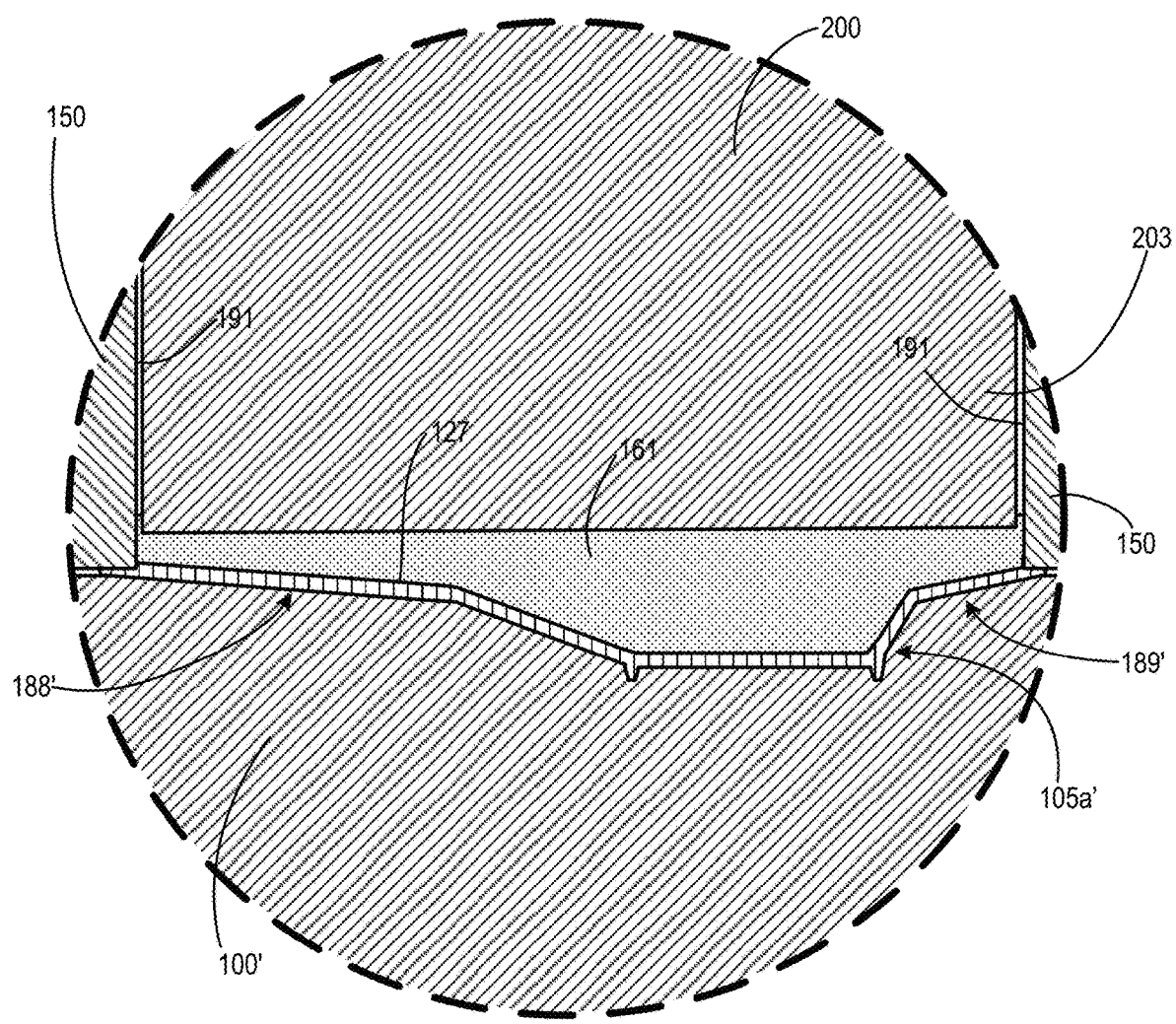

For convenience, FIGS. 3E2, 4A and 4B depict expansion cavity 105a as having edges separated from sidewalls 191 of pour cavity 153 by horizontal regions 192 and 193. In some embodiments, cavities may be expanded to include sloped portions that extend to toward pour cavity sidewalls. One example of such an embodiment is shown in FIGS. 4C and 4D. FIG. 4C is an enlarged area cross sectional view of an assembly of mold elements 150 and 200 with a mold element 100' instead of mold element 100. Except as discussed below, element 100' is similar to element 100. A panel similar to panel 120 (having a base panel 127) was previously placed between a working face of element 100' and the panel face of element 150, mixture 160 was delivered into cavity 153 of element 150 and onto an interior face of base panel 127, and element 200 then placed onto element 150 so that piston 203 extends into the cavity that received mixture 160.

Cavity 105*a*' of element 100' differs slightly from cavity 105*a* of element 100. In particular, cavity 105*a*' is expanded to include shallow sloped regions 188' and 189' that replace horizontal regions 192 and 193 shown in FIGS. 4A and 4B. Sloped regions 188' and 189' may form the entire periphery of cavity 105*a*', but the slope and width of regions 188' and 189' may vary at different locations around that periphery. Other cavities of element 100' may include shallow-sloped peripheral regions similar to regions 188' and 189'. Regions 188' and 189', as well as similar regions of other cavities, may be included to help spreading of mixture 160 and reduce formation of mold flash between mold elements.

FIG. 4D is a view of the same region shown in FIG. 4C. At the time represented in FIG. 4D, however, foam-producing chemical mixture 160 has reacted to form polymer foam 161. Expansion pressure during formation of foam 161 has pushed a portion of the panel into expansion cavity 105*a*', including portions 188' and 189'. In a similar manner, expansion pressure during formation of foam 161 has pushed additional panel portions into other expansion cavities.

Figure 5A:
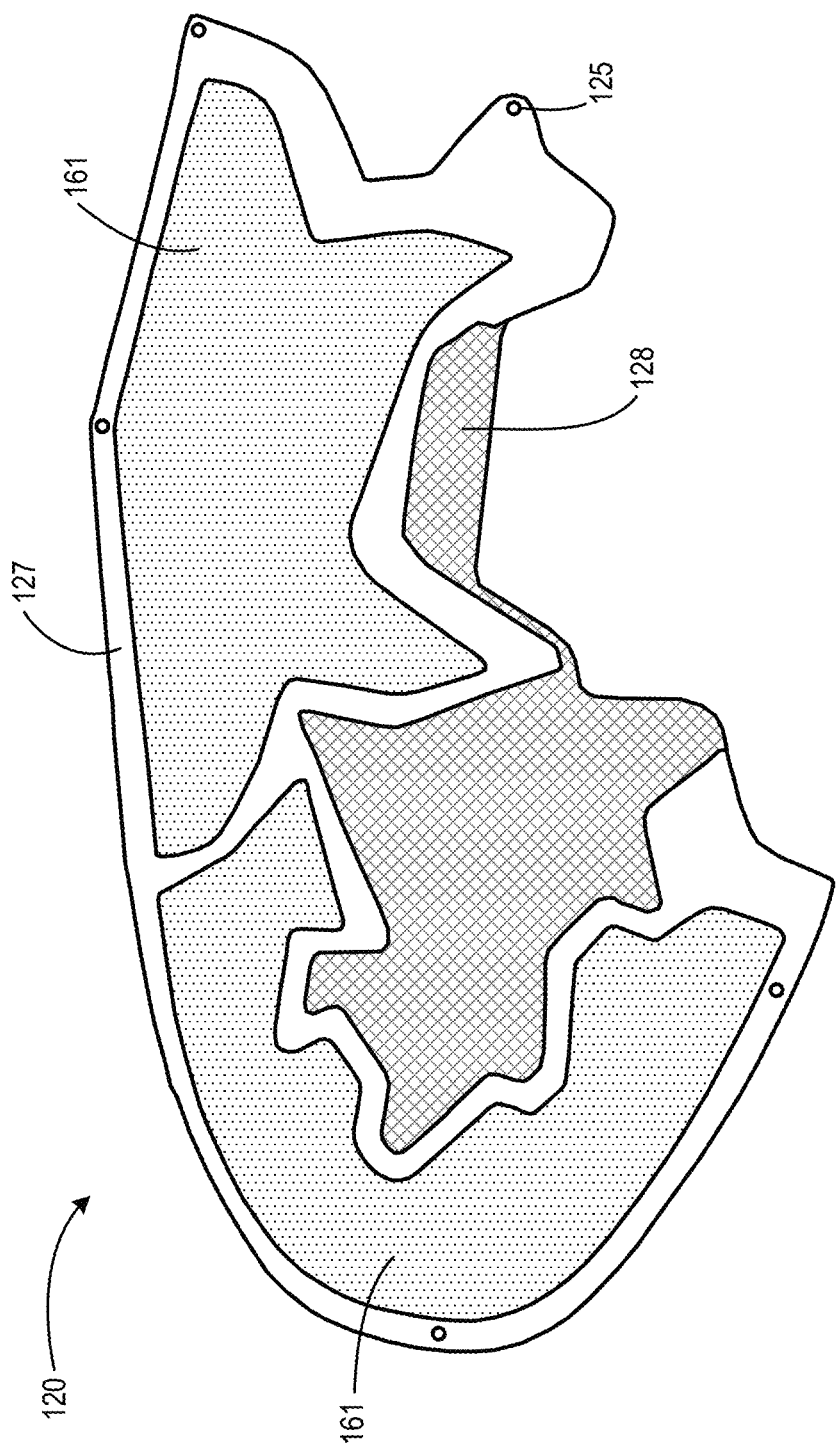
FIG. 5A shows an interior face of an unfolded upper shell panel subsequent to forming of contoured foam regions.
Figure 5B:
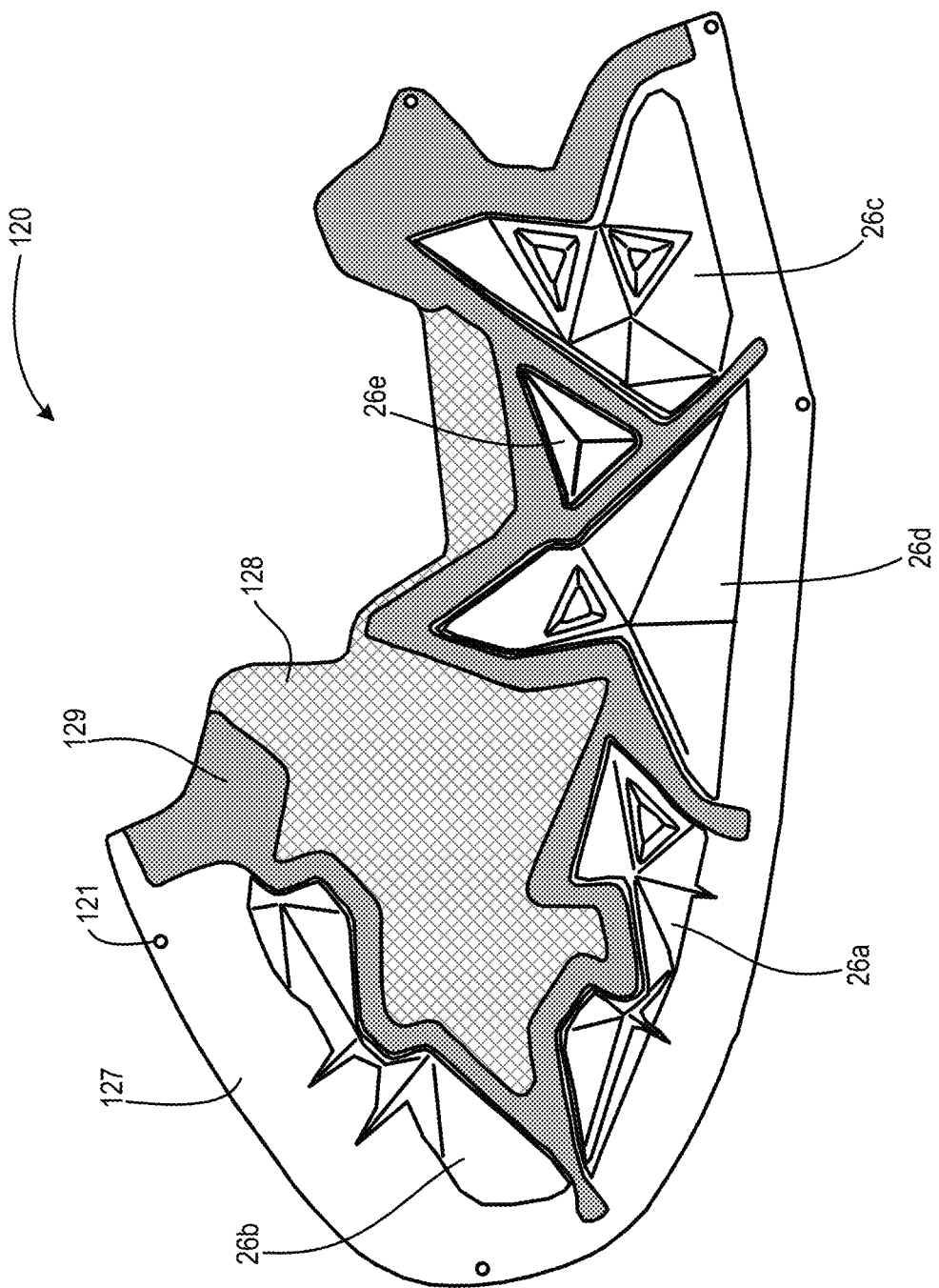
FIG. 5B shows an exterior face of the unfolded upper shell panel of FIG. 5A.

Subsequent to the operations shown in FIGS. 3A1 through 4A, and after expansion, bonding and curing of foam 161, upper shell panel 120 is removed from the mold. FIG. 5A shows the interior face of upper shell panel 120 after removal of second mold element 150 and after removal from working face 101 of first mold element 100. FIG. 5B shows the exterior face of upper shell panel 120 from FIG. 5A. As seen in FIG. 5B, contoured foam regions 26*a*-26*e* have now been formed. As seen by comparing FIG. 5B with FIGS. 1A-1C, region 26*a* is located in a portion of panel 120 that corresponds to lateral midfoot and forefoot regions of upper 12, region 26*b* is located in a portion of panel 120 that corresponds to medial forefoot and midfoot regions of upper 12, region 26*c* is located in a portion of panel 120 that corresponds to a medial heel region of upper 12, region 26*d* is located in a portion of panel 120 that corresponds to a lateral heel region of upper 12, and region 26*e* is located in a portion of panel 120 that corresponds to a rear heel region of upper 12.

Figure 6:
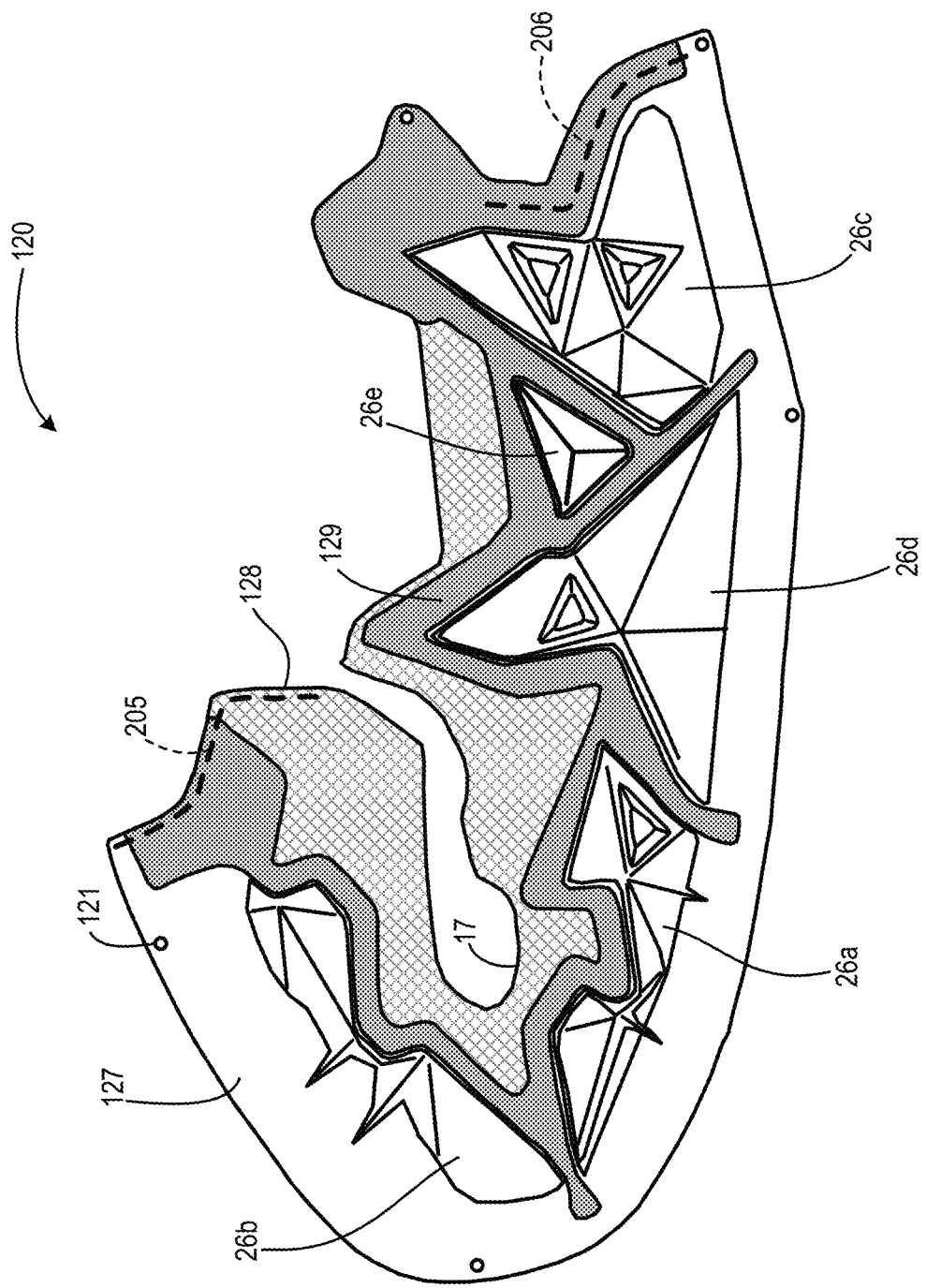
FIG. 6 shows the exterior face of the unfolded upper shell panel of FIG. 5B after trimming to form a tongue opening.

FIG. 6 shows upper shell panel 120 after tongue opening 17 has been cut out of a portion of mesh panel 128. After additional operations (e.g., additional trimming operations, attachment of padded collar 22, attachment of other components), panel 120 may then be converted to shell 15 by folding panel 120 into a complex three dimensional shape that approximates the ultimate shape of upper 12. In some embodiments, this folding is performed by gluing, stitching or otherwise attaching an edge 205 of panel 120 to an edge 206 of panel 120. After formation of shell 15 by this folding, operations such as steps 90 (attachment of a lasting element) and 93 (attachment of a sole structure) may be performed. In some embodiments, additional fabrication operations may be performed before, during or after the folding of panel 120 into shell 15. For example, additional elements of upper 12 may be attached to panel 120 prior to folding or after folding. Shell 15 may undergo shaping operations prior to attachment of sole structure 24; such shaping operations may occur before and/or after attachment of a lasting element. In some embodiments, such shaping operations may include reheating shell 15 or a portion thereof while shell 15 is on a last or other form.

As indicated above, shoe 10 is a left foot shoe. Similar operations may be performed to fabricate a right foot shoe using a set of mold elements that are mirror images of mold elements 100, 150 and 200.

Figure 7A:
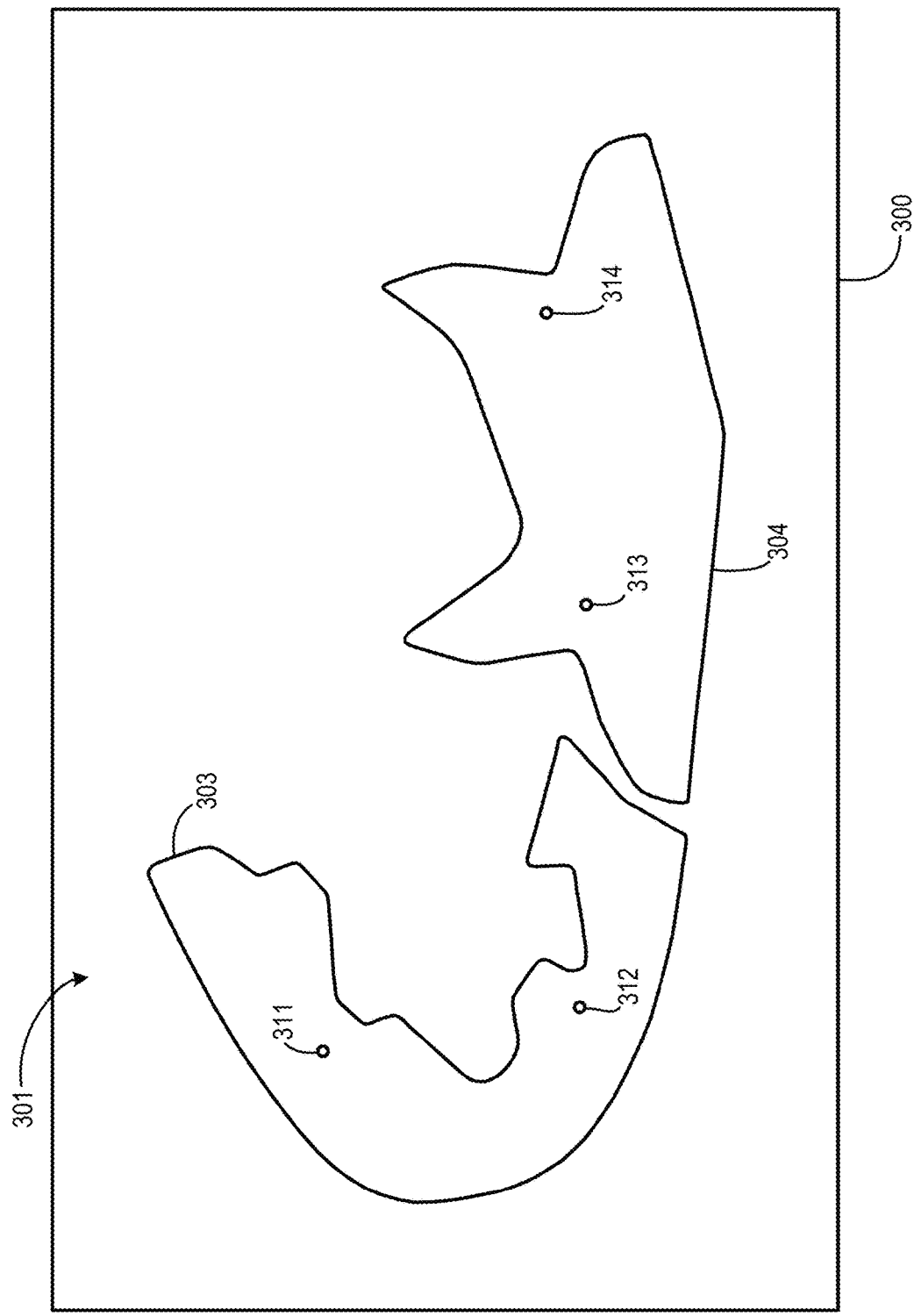
FIG. 7A shows a closing face of a third mold element according to another embodiment.

In some embodiments, additional components may be added to an upper shell panel during the process of forming contoured foam regions. In some embodiments, for example, the pistons of a third mold section may be configured to hold one or more components that are to be embedded in and bonded to an interior side of the polymer foam used to create contoured foam regions. FIG. 7A shows a mold closing face 301 of a third mold element 300 according to some such embodiments. Third mold element 300 may be used with first mold element 100 and second mold element 150 instead of third mold element 200. Except as described below, third mold element 300 is substantially the same as third mold element 200.

Mold element 300 includes a piston 303 that is substantially the same as piston 203 of mold element 200. Unlike piston 203, however, piston 303 includes a pair of registration posts 311 and 312. Piston 304 of mold element 300 is substantially the same as the piston of mold element 200 that fits within pour cavity 154 of second mold element 150. Unlike that piston of mold element 200, however, piston 304 of mold element 300 includes registration posts 313 and 314.

Figure 7B:
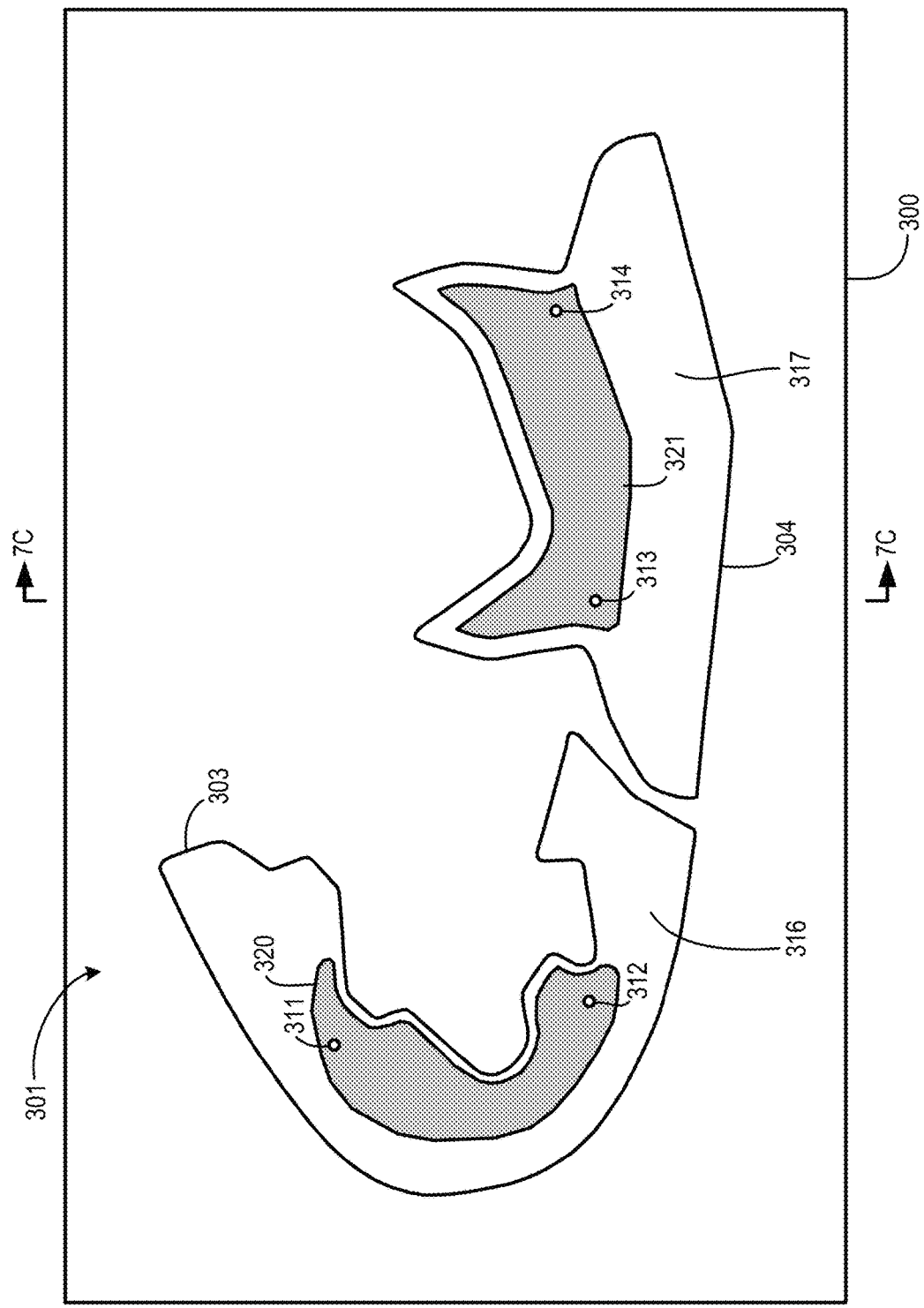
FIG. 7B shows the third mold element of FIG. 7A after placement of reinforcing elements.

Mold elements 100, 150 and 300 may be used in a modified process that, except as described below, is substantially identical to the process described above in connection with mold elements 100, 150 and 200. In the modified process, and as shown in FIG. 7B, reinforcement elements 320 and 321 are respectively placed onto pistons 303 and 304 prior to placement of mold element 300 onto second mold element 150. Reinforcement elements 320 and 321 may be, e.g., thermoplastic sheet elements added to help shape and/or reinforce shell 15. For example, reinforcement element 320 may be heated and shaped in subsequent steps to help create a toe box. Reinforcement element 321 may be heated and shaped in subsequent steps to help create a counter. In some embodiments, reinforcement elements 320 and 321 are placed onto mold element 300 subsequent to placement of second mold element 150 onto first mold element 100 but prior to delivery of foam-producing chemical mixture 160 to pour cavities 153 and 154.

Figure 7C:
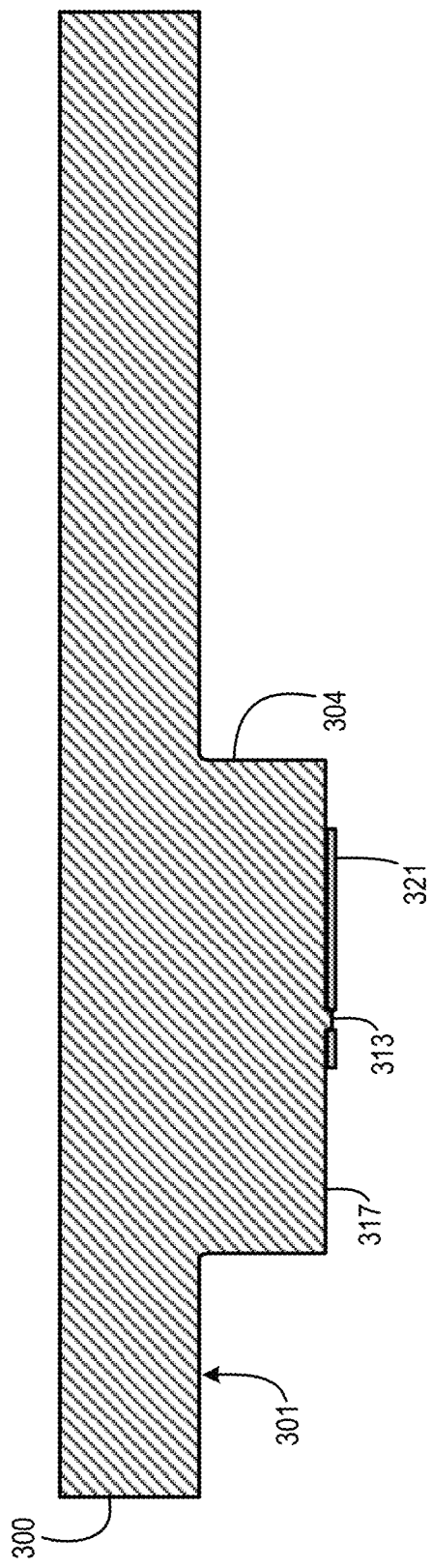
FIG. 7C is an enlarged area cross-sectional view taken from the location indicated in FIG. 7B and rotated 90° clockwise.

FIG. 7C is an enlarged area cross sectional view of taken from the location indicated in FIG. 7B and rotated 90° clockwise. As seen in FIG. 7C, element 321 rests on the flat end face 317 of piston 304. Element 320 similarly rests on the flat end face 16 of piston 303 (FIG. 7B).

Figure 7D:
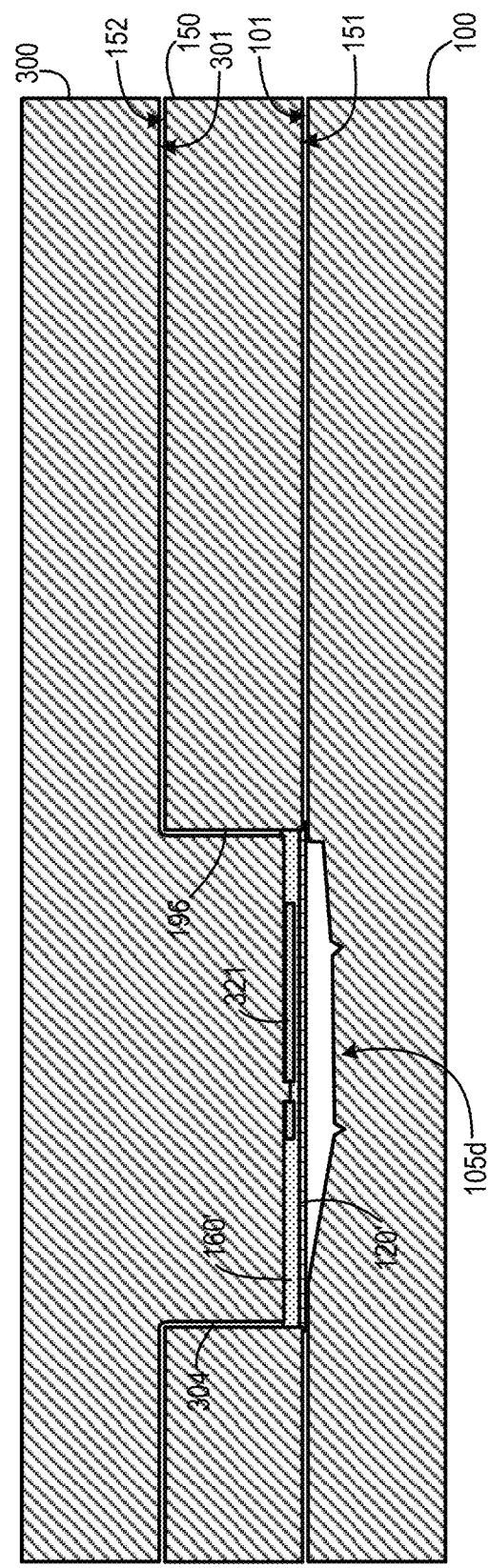
FIG. 7D is an enlarged area cross-sectional view of the third mold element of FIG. 7A, but assembled with first and second mold elements.

FIG. 7D is an area cross sectional view of mold element 300 after placement onto mold element 150 during operations similar to those described above in connection with FIGS. 3A1 through 4A. Although numbered 120' and 160' to avoid confusion with the previous discussion, upper shell panel 120' placed between elements 100 and 150 and mixture 160' added to pour cavity is 154 may be identical to panel 120 and mixture 160 discussed above. The sectioning plane of FIG. 7D passes through the same plane of mold element 300 sectioned by the plane of FIG. 7C and through planes of mold elements 100 and 150 that coincide with the plane of FIG. 7C when mold elements 100, 150 and 300 are assembled so that pistons 303 and 304 rest within pour cavities 153 and 154, respectively. As seen in FIG. 7D, reinforcement element 321 is pressed into mixture 160'. In 7D, the cream time for mixture 160' has not yet expired and mixture 160' has not begun to significantly expand.

Figure 7E:
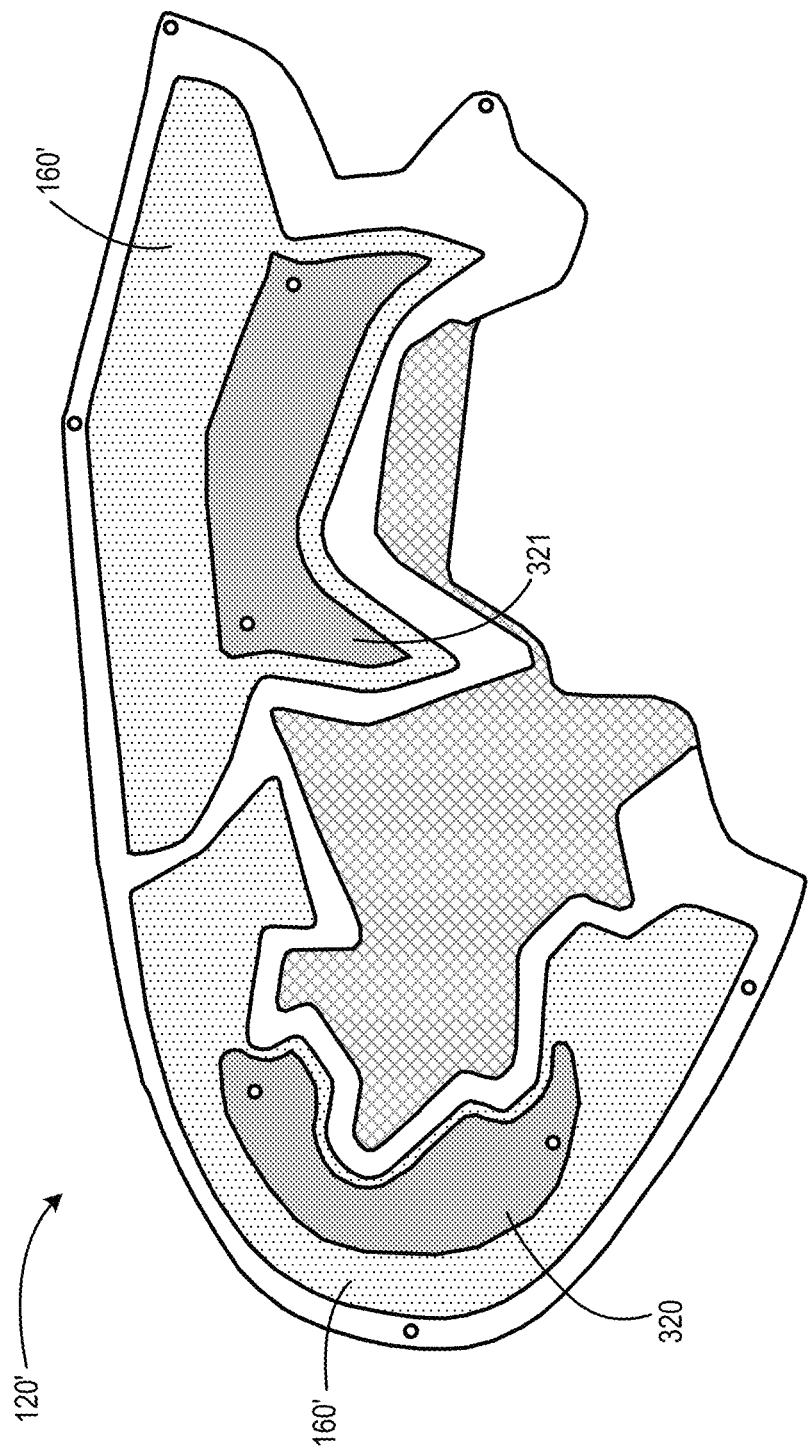
FIG. 7E shows an interior face of an unfolded upper shell panel formed using the mold assembly of FIG. 7D.

Subsequently, mixture 160' expands and cures and foams polymer foam 161' that is bonded to upper panel 120'. FIG. 7E shows the interior face of panel 120' after removal from between first mold element 100 and second mold element 150. Reinforcement elements 320 and 321 are embedded in and bonded to foam 161'. The exterior face of panel 120', not shown, is similar to the exterior face of panel 120 as shown in FIG. 5B.

Additional embodiments include numerous variations on the processes and articles described above. In some embodiments, for example, a mold section may include more than one element. For example, second mold element 150 could be divided into two separate elements that are arranged side-by-side when assembled with elements of the first and third sections. The first and/or third sections could also comprise multiple elements. In certain embodiments, the first, second and third section elements are connected with hinges that allow the second section to be placed onto the first section and the third section to be placed onto the second section.

Figure 8A:
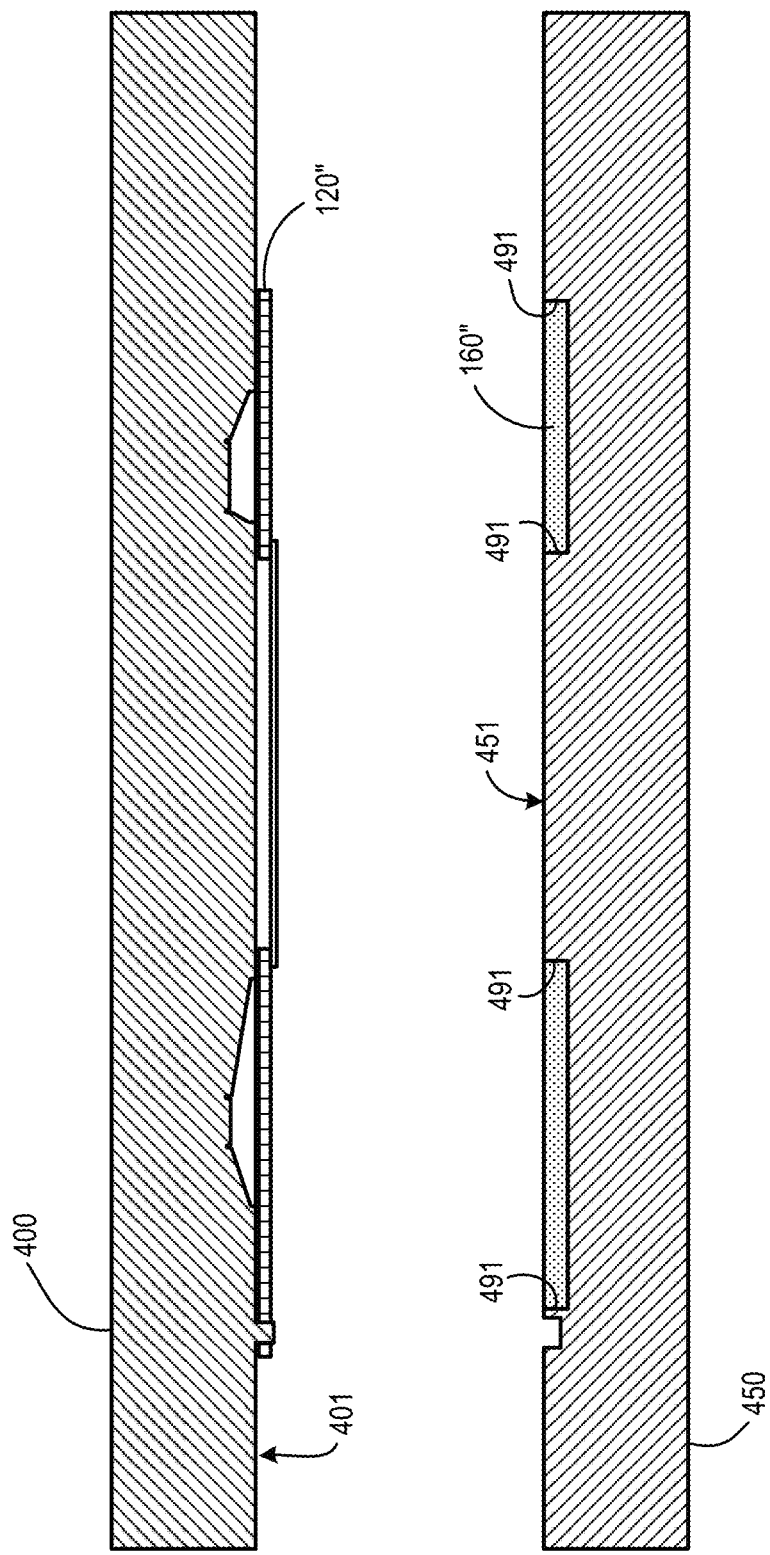
FIGS. 8A and 8B are area cross sectional views showing mold elements according to another embodiment.
Figure 8B:
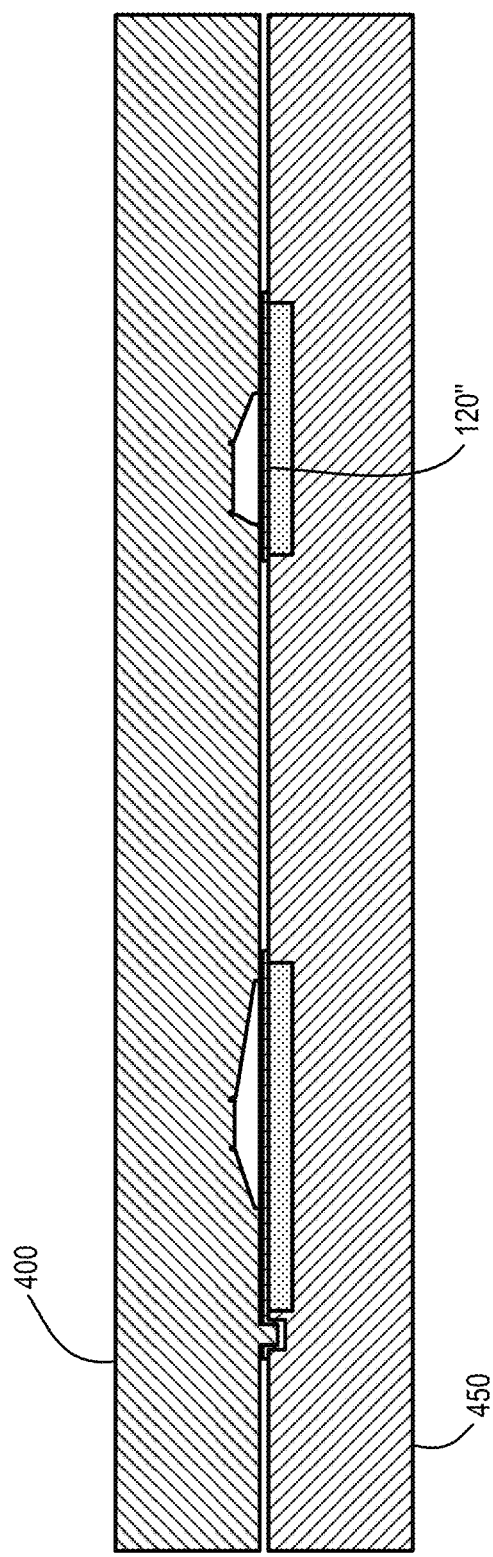

In some embodiments, a mold may only have two sections. For example, and as shown in FIG. 8A, second and third section elements such as those described above could be combined into a second mold section element 450. A pour cavity having side wall 491 may only have an opening on a panel face 451 of mold element 450. After delivering a foam-producing chemical mixture 160" into that pour cavity (and other pour cavities, if present), a first mold element 400 with an upper shell panel 120" held thereon (e.g., with registration posts) may be placed onto panel face 451, as shown in FIG. 8B, thereby placing panel 120" between first and second mold sections. Mold element 400, panel 120" and mixture 160" may be substantially the same as mold element 100, panel 120 and mixture 160. The pour cavity having side wall 491 may have a shape (in the plane of panel face 451) that is substantially the same as that of pour cavity 153 (in the plane of panel face 151). Another pour cavity of second mold element 450 may have a shape, in the plane of panel face 451, that is substantially the same as that of pour cavity 154 in the plane of panel face 151.

Figure 9A:
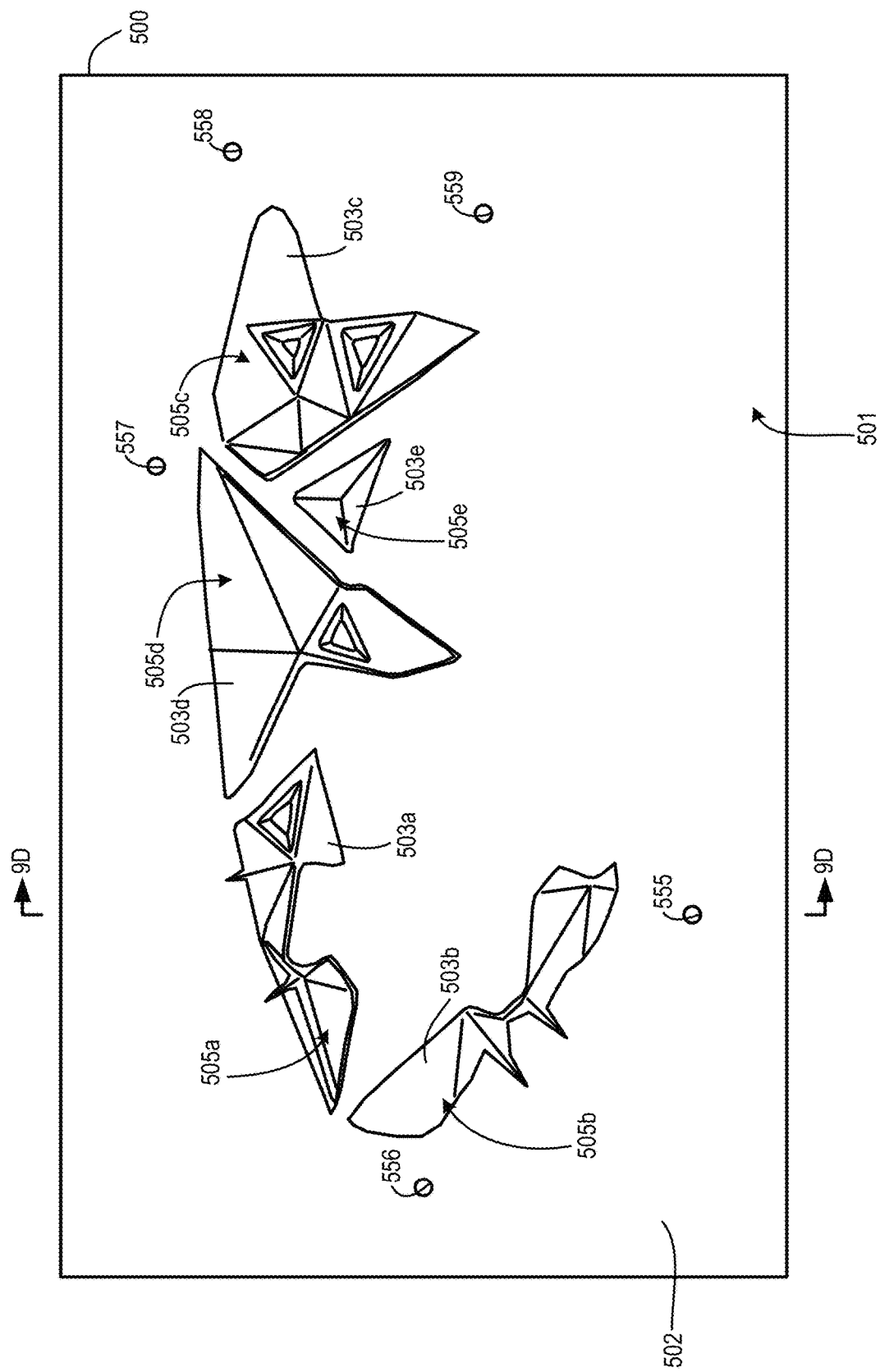
FIGS. 9A through 9E show mold elements according to another embodiment.

In some embodiments, an upper shell panel may be placed between first and second mold sections by first attaching that panel to the second mold section. FIG. 9A is a plan view of a mold element 500 according to one such embodiment. Mold element 500 is a first section mold element. Except as described below, mold element 500 is substantially the same as mold element 100. In particular, working face 501, base surface 502, contoured surfaces 503a-503e, and expansion cavities 505a-505b are the same, respectively, as working face 101, base surface 102, contoured surfaces 103a-103e, and expansion cavities 105a-105b. Unlike mold element 100, however, mold element 500 lacks registration posts. Instead, mold element 500 includes recesses 555 through 559 that accommodate registration posts in a second mold section.

Figure 9B:
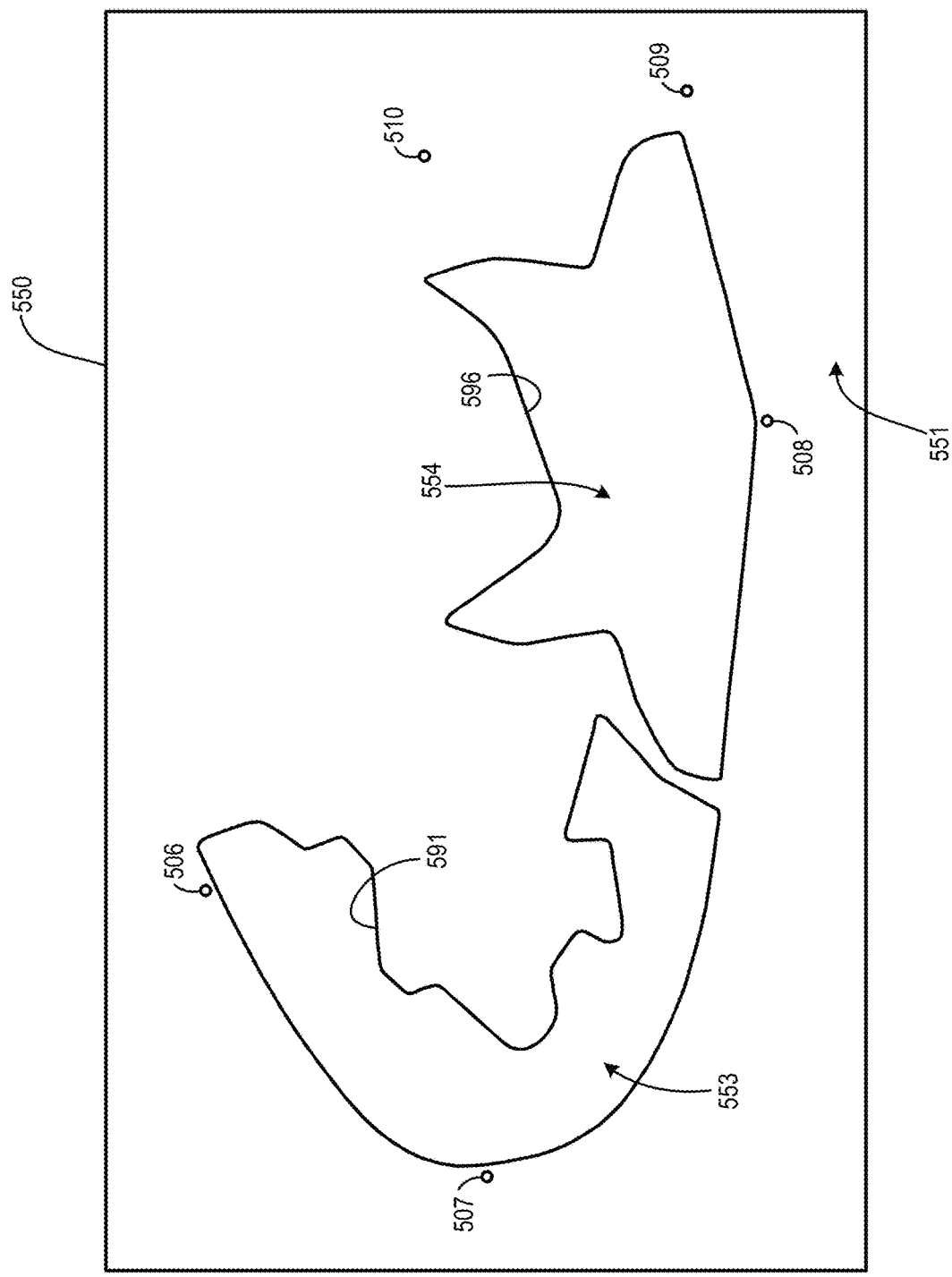

FIG. 9B is a plan view of that second mold section. In particular, FIG. 9B shows a panel face 551 of a mold element 550. Except as described below, mold element 550 is substantially the same as mold element 150. Pour cavities 553 and 554, which are respectively similar to pour cavities 153 and 154, have openings in panel face 551 and in pouring face 552 (see FIG. 9D). Pour cavity 553 has a side wall 591; pour cavity 554 has a side wall 596. Unlike mold element 150, however, panel face 551 of mold element 550 includes registration posts 506 through 510 having positions that respectively mate with recesses 555-559 when mold element 550 is placed onto mold element 500.

Figure 9C:
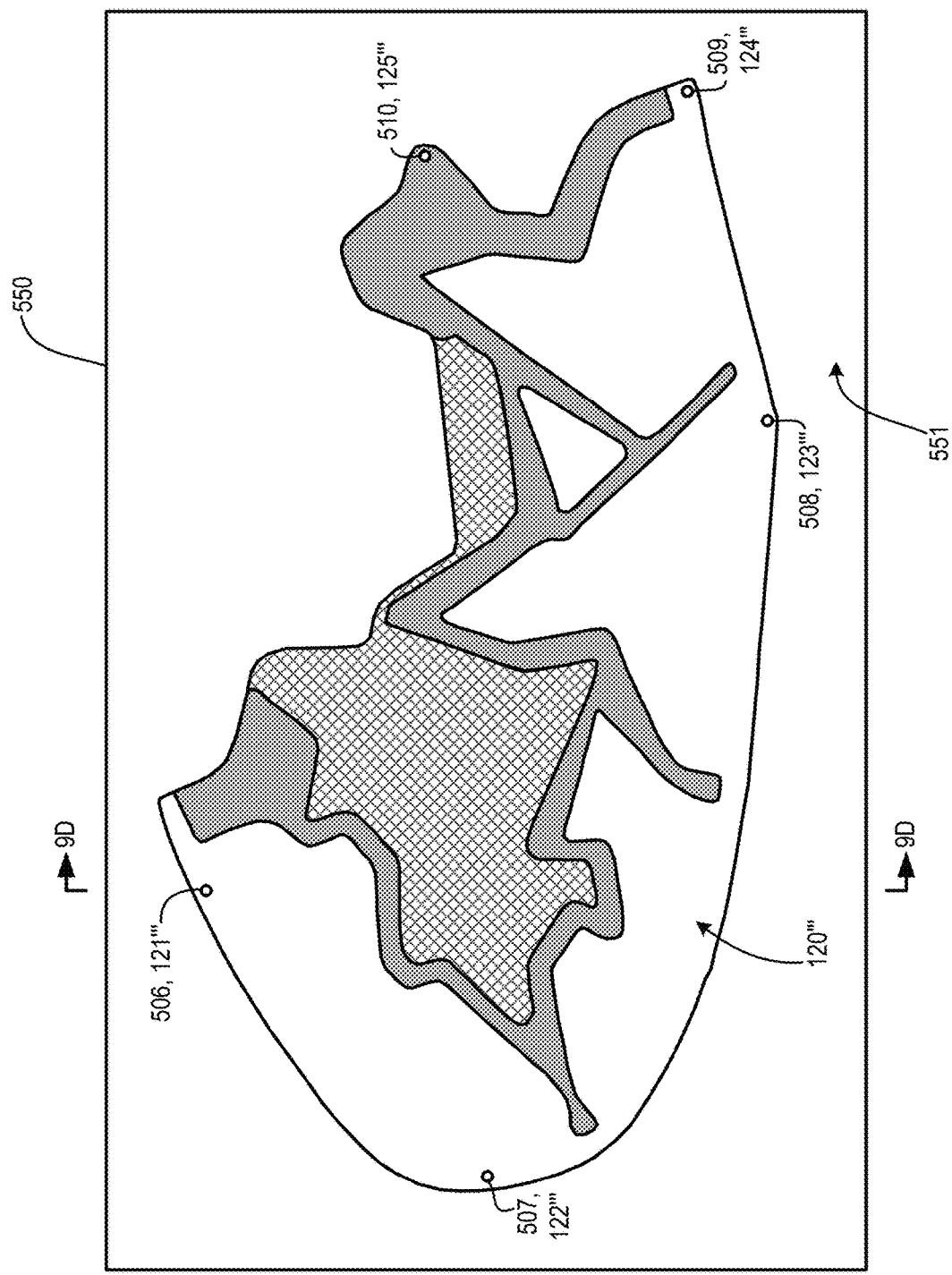
Figure 9D:
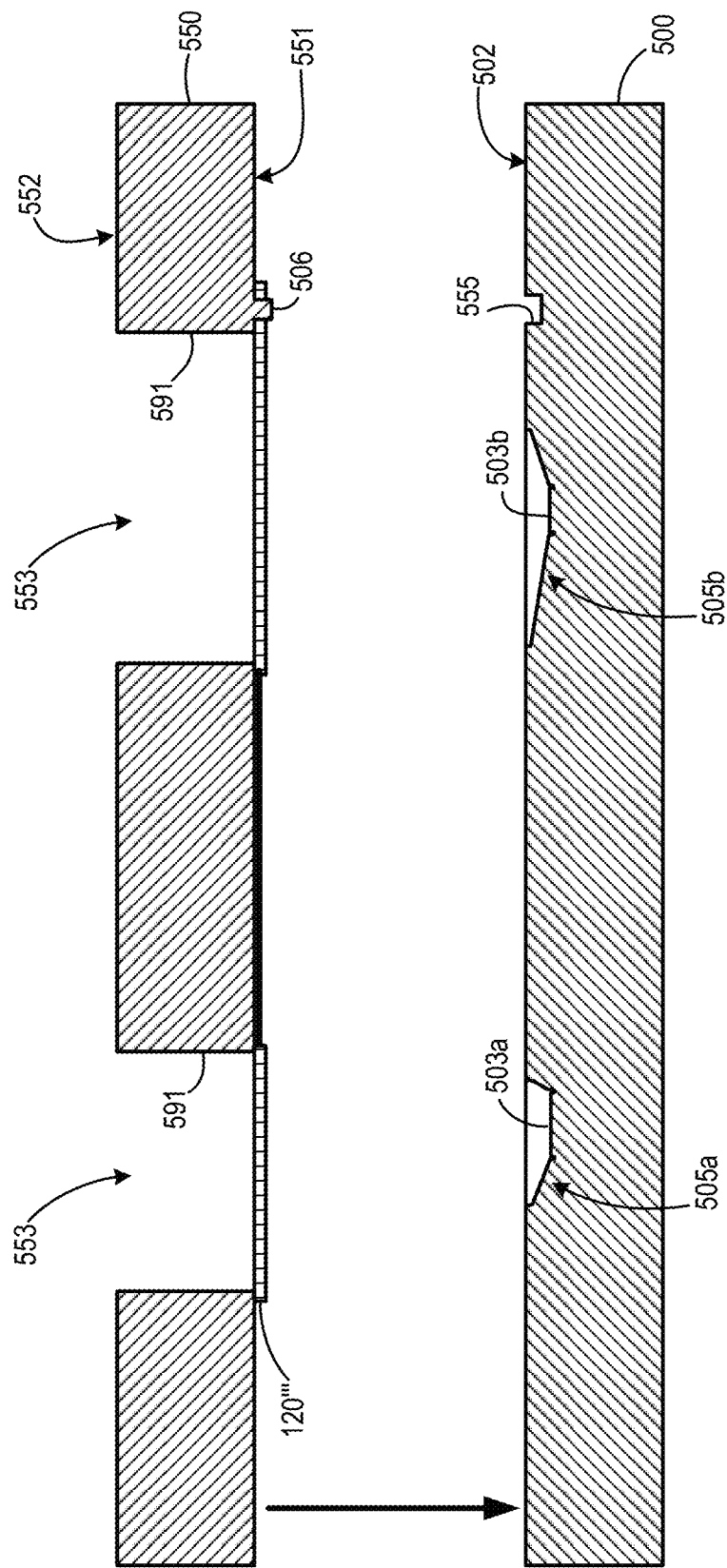
Figure 9E:
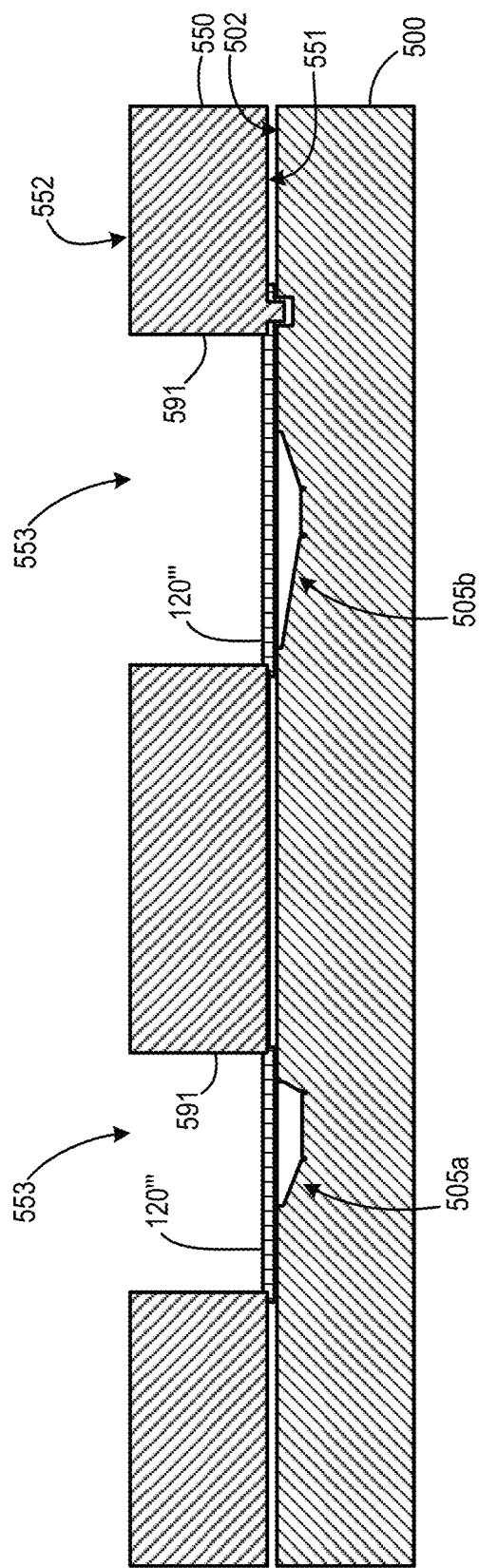

FIG. 9C shows panel face 551 after an upper shell panel 120''' (which may be the same as panel 120) is placed thereon. Posts 506-510 respectively extend through holes 121'''-125''' of panel 120''' and hold panel 120''' in place. An exterior face of panel 120''' is exposed in FIG. 9C. An interior face of panel 120''', not shown, is placed against panel face 551. After placing panel 120''' onto panel face 551, mold element 550 may be placed onto mold element 500 to thereby place panel 120''' between first and second mold sections. This is shown in FIGS. 9D and 9E, which are enlarged cross-sectional views. The sectioning plane for mold element 500 in FIGS. 9D and 9E is taken from the location indicated in FIG. 9A and rotated 90° counterclockwise. The sectioning plane for mold element 550 in FIGS. 9D and 9E is taken from the location indicated in FIG. 9C and rotated 90° clockwise. The assembled elements 500 and 550, with panel 120''' therebetween, may then be used (in conjunction with a third mold section such as element 200 or element 300) in manners similar to those described in connection with element 200 and element 300 to form contoured foam regions in panel 120'''.

In some embodiments, a mold element may have more than two pour cavities or may have only a single pour cavity. Similarly, less or more than five expansion cavities may be present.

Shell 15 merely represents one example of an article that can be formed according to various embodiments. As previously indicated, a shell or other component of a footwear upper could include more or less than five contoured foam regions. Contoured foam regions could have different shapes, relative arrangements and/or contours. Portions of a shell panel joined to create an upper shell may be located in positions other than those indicated in FIG. 6 (e.g., in regions that will lie behind the heel in a completed upper). In some embodiments, an upper shell panel formed using one or more processes such as those described herein may not completely surround the wearer foot in a completed upper.

As indicated above, shell 15 of shoe 10 is merely one example of a footwear upper component according to various embodiments and which can be fabricated using methods according to various embodiments. In some embodiments, an upper component may have more or fewer contoured foam regions than shell 15. A first mold element in a mold assembly for fabricating such a component may include a correspondingly greater or lesser number of expansion cavities. In embodiments where the shape and arrangement foam regions differs from that of shell 15, the shape and arrangement of expansion cavities in a first mold element may also differ from those of element 100 so as to correspond to the foam regions to be formed.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. Any and all combinations, subcombinations and permutations of features from above-described embodiments are the within the scope of the invention. A reference in a claim to a potential or intended wearer or a user of a component does not require actual wearing or using of the component or the presence of the wearer or user as part of the claimed article or method.

The invention claimed is:

1. A method comprising: delivering a foam-producing chemical mixture into one or more pour cavities formed in a working face of a first mold element; pressing, after delivering the foam-producing chemical mixture into the one or more pour cavities, an upper shell panel between the working face of the first mold element and a working face of a second mold element, wherein the working face of the second mold element comprises one or more expansion cavities formed therein, and wherein, during the pressing, each of the one or more expansion cavities is positioned opposite, and separated by a corresponding one of one or more portions of the upper shell panel from, a corresponding one of the one or more pour cavities; allowing, while the upper shell panel is pressed between the working face of the first mold element and the working face of a second mold element, the delivered mixture to expand and force the one or more portions of the upper shell panel into the one or more expansion cavities; removing the upper shell panel from the mold elements subsequent to the expansion of the delivered mixture; and forming a footwear shell from the upper shell panel.

2. The method of claim 1, wherein the pressing comprises coupling the upper shell panel to the working face of the second mold element and then moving the working face of the second mold element and coupled upper shell panel toward the working face of the first mold element.

3. The method of claim 1, wherein the upper shell panel is in an unfolded condition when pressed between the working face of the first mold element and the working face of the second mold element.

4. The method of claim 1, wherein the footwear shell is a footwear upper shell, and the forming of the footwear upper shell from the upper shell panel occurs after removal of the upper shell panel from the mold elements.

5. The method of claim 4, wherein the forming comprises folding the upper shell panel.

6. The method of claim 5, wherein the forming comprises attaching one portion of the folded upper shell panel to another portion of the folded upper shell panel.

7. The method of claim 5, further comprising attaching a lasting element to the formed footwear upper shell.

8. The method of claim 4, further comprising attaching one or more sole structure elements to the formed footwear upper shell.

9. The method of claim 1, wherein
the upper shell panel includes regions corresponding to medial and lateral regions of a completed upper,
the upper shell panel removed from the mold elements includes contoured foam regions formed during the allowing step, and
the contoured foam regions are located in the upper shell panel regions corresponding to the medial and lateral regions of the completed upper.

10. The method of claim 1, wherein
the upper shell panel includes regions corresponding to medial and lateral forefoot regions of a completed upper, medial and lateral midfoot regions of a completed upper, and medial and lateral heel regions of a completed upper,
the upper shell panel removed from the mold elements includes contoured foam regions formed during the allowing step, and the contoured foam regions are located in the upper shell panel regions corresponding to the medial and the lateral forefoot regions of the completed upper, in the upper shell panel regions corresponding to the medial and the lateral midfoot regions of the completed upper, and in the upper shell panel regions corresponding to the medial and the lateral heel regions of the completed upper.

11. The method of claim 1, wherein the working face of the second mold element includes a plurality of registration projections, and further comprising:
placing, prior to the pressing, the upper shell panel on the working face of the second mold element so that the registration projections extend through corresponding registration openings in the upper shell panel.

12. The method of claim 1, wherein the working face of the first mold element includes a planar base surface and a plurality of first contoured surfaces, each of the first contoured surfaces being recessed into the first mold element and defining one of the pour cavities, and wherein the working face of the second mold element includes a planar base surface and a plurality of second contoured surfaces, each of the second contoured surfaces being recessed into the second mold element and defining one of the expansion cavities.

13. The method of claim 1, wherein the upper shell panel comprises a composite upper shell panel including a plurality of bonded panels.

14. The method of claim 1, wherein the upper shell panel includes a skin/textile composite panel, the skin/textile composite panel comprising an elastic textile material bonded to a polymer skin material, and wherein the pressing comprises placing the upper shell panel so that the one or more portions separating the one or more pour cavities and the one or more expansion cavities comprise the skin/textile composite panel.

15. The method of claim 1, wherein
the working face of the first mold element comprises a planar first base surface having the one or more pour cavities formed therein, and
the working face of the second mold element comprises a planar second base surface having the one or more expansion cavities formed therein.

16. The method of claim 15, wherein the working face of the second mold element comprises one or more registration projections extending outward from the working face of the second mold element.

17. The method of claim 16, wherein the one or more expansion cavities comprise a plurality of expansion cavities, and wherein the plurality of expansion cavities have positions on the working face, of the second mold element, corresponding to medial and lateral forefoot regions, medial and lateral midfoot regions, and medial and lateral heel regions of a flattened footwear upper.

18. The method of claim 15, wherein the one or more expansion cavities comprise a plurality of expansion cavities, and wherein the plurality of expansion cavities have positions on the working face, of the second mold element, corresponding to medial and lateral forefoot regions, medial and lateral midfoot regions, and medial and lateral heel regions of a flattened footwear upper.

* * * * *